United States Patent
Kobayashi et al.

(10) Patent No.: US 10,630,465 B2
(45) Date of Patent: Apr. 21, 2020

(54) KEY EXCHANGE METHOD, KEY EXCHANGE SYSTEM, COMMUNICATION DEVICE AND STORAGE MEDIUM THEREFORE

(71) Applicant: NIPPON TELEGRAPH AND TELEPHONE CORPORATION, Chiyoda-ku (JP)

(72) Inventors: Tetsutaro Kobayashi, Tokyo (JP); Reo Yoshida, Tokyo (JP); Hitoshi Fuji, Tokyo (JP); Tomohide Yamamoto, Tokyo (JP); Yuto Kawahara, Tokyo (JP); Kazuki Yoneyama, Ibaraki (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 386 days.

(21) Appl. No.: 15/487,895

(22) Filed: Apr. 14, 2017

(65) Prior Publication Data
US 2017/0302445 A1    Oct. 19, 2017

(30) Foreign Application Priority Data
Apr. 19, 2016   (JP) .................................. 2016-083633

(51) Int. Cl.
*H04L 29/06* (2006.01)
*H04L 9/08* (2006.01)
(Continued)

(52) U.S. Cl.
CPC .......... *H04L 9/0822* (2013.01); *H04L 9/0643* (2013.01); *H04L 9/083* (2013.01);
(Continued)

(58) Field of Classification Search
CPC . H04L 9/0822; H04L 63/0428; H04L 63/061; H04L 63/065; H04L 9/0643;
(Continued)

(56) References Cited

U.S. PATENT DOCUMENTS 8,132,006 B2 *   3/2012   Ramzan ................ H04L 63/083
                                                            713/168
9,166,790 B2 *  10/2015   Nakashima ........... H04L 9/0841
(Continued)

OTHER PUBLICATIONS

Suvo Mittra, "Iolus: A Framework for Scalable Secure Multicasting," SIGCOMM '97, pp. 227-288, 1997.
(Continued)

*Primary Examiner* — Yogesh Paliwal
(74) *Attorney, Agent, or Firm* — Oblon, McClelland, Maier & Neustadt, L.L.P.

(57) ABSTRACT

Plurality of users share a common key while permitting dynamic member change and computational complexity required for key exchange is reduced. The first key generation unit 212 of the communication devices $U_i$ computes $R_i$ and $c_i$, or $c_i$ based on a twisted pseudo-random function. A session ID generation unit 113 of a key distribution device S generates sid based on a target-collision resistant hash function and transmits sid to the communication devices $U_i$. A second key generation unit 214 of the communication devices $U_i$ computes $T_i$ based on a pseudo-random function. A third key generation unit 115 of the key distribution device S computes k' and $T'_i$ based on the twisted pseudo-random function. A session key generation unit 217 of the communication devices $U_i$ generates the common key $K_2$ based on a pseudo-random function.

12 Claims, 6 Drawing Sheets

KEY EXCHANGE SYSTEM

(51) Int. Cl.
*H04L 9/06* (2006.01)
*H04L 9/14* (2006.01)
*H04L 9/30* (2006.01)

(52) U.S. Cl.
CPC .......... *H04L 9/0825* (2013.01); *H04L 9/0838* (2013.01); *H04L 9/0869* (2013.01); *H04L 9/0891* (2013.01); *H04L 9/0894* (2013.01); *H04L 9/14* (2013.01); *H04L 9/30* (2013.01)

(58) Field of Classification Search
CPC ..... H04L 9/0825; H04L 9/0833; H04L 9/083; H04L 9/0838; H04L 9/0869; H04L 9/0891; H04L 9/0894; H04L 9/14; H04L 9/30
See application file for complete search history.

(56) References Cited

U.S. PATENT DOCUMENTS

2006/0078110 A1* 4/2006 Kim .................. G06Q 20/3829
380/30
2009/0208005 A1* 8/2009 Kusakawa ............ H04L 9/3073
380/46
2017/0187524 A1* 6/2017 Furukawa ................. H04L 9/08

OTHER PUBLICATIONS

A. Ballardie, "Scalable Multicast Key Distribution," 18 pages, May 1996.
Oded Goldreich, "Modern Cryptography, Probabilistic Proofs and Pseudo-randomness," (English and Japanese versions), Springer-Verlag Tokyo Inc., 2001.
Johannes A. Buchmann, "Introduction to Cryptography The original $3^{rd}$ edition," (English and Japanese versions), Maruzen Publishing Co. Ltd., 2007.
Boneh et al., "Functional Encryption: Definitions and Challenges," TCC, Lecture Notes in Computer Science, vol. 6597, 24 pages, 2011.
Kazuki Yoneyama, "One-Round Authenticated Key Exchange with Strong Forward Secrecy in the Standard Model against Constrained Adversary," IEICE Transactions, vol. E96-A, No. 6, p. 1124-1138, Jun. 2013.
Kobayashi et al., "Scalable and Dynamic Multi-Cast Key Distribution," SCIS 2016, 7 pages, Jan. 2016.

* cited by examiner

KEY EXCHANGE METHOD, KEY EXCHANGE SYSTEM, COMMUNICATION DEVICE AND STORAGE MEDIUM THEREFORE

TECHNICAL FIELD

The present invention relates to an application of an information security technology, and especially relates to a key exchange technology by which a plurality of users forming a group share a common key.

The present application claims priority based on Japanese Patent Application 2016-083663 which was filed in Japan on Apr. 19, 2016 and contents thereof are incorporated herein.

BACKGROUND ART

The key exchange technology by which a plurality of users forming a group share a common key has been conventionally proposed. An architecture of an information system for realizing such key exchange technology is described in "Suvo Mittra, "Iolus: a framework for scalable secure multicasting", SIGCOMM '97, pp. 277-288, 1997" (referred to below as Non-patent literature 1), for example. An algorithm for such key exchange technology is described in "Scalable Multicast Key Distribution", [online], [retrieved on Mar. 4, 2016], internet <URL:https://tools.ietforg/html/rfc1949>" (referred to below as Non-patent literature 2), for example.

SUMMARY OF THE INVENTION

In the related-art technologies described in Non-patent literatures 1 and 2, since users who share a common key need to be registered in advance, it is impossible for a plurality of users to share the common key while permitting dynamic member change. Further, since the whole computational complexity required for key exchange is O(log n) when the number of users is denoted as n, there is a problem that the computational complexity for the key exchange is increased along with increase of the number of users.

An object of the present invention is to provide a key exchange technology which enables a plurality of users to share a common key while permitting dynamic member change and enables reduction in computational complexity required for key exchange.

In order to solve the above-described problem, a key exchange method according to the present invention is the key exchange method for a case where, in a key exchange system which includes a key distribution device S and n+k pieces (here, n is an integer which is 2 or larger and k is an integer which is 1 or larger) of communication devices $U_i$ (i=1, ..., n+k), communication devices $U_{n+1}$, ..., $U_{n+k}$ newly join a session established by communication devices $U_1$, ..., $U_n$, in which $\|$ is a concatenation operator, $U_1$ is one piece of representative communication device which is selected from the communication devices $U_1$, $U_n$, $U_{n+1}$, ..., $U_{n+k}$, a secret key $sk_S$ for public key encryption and secret strings $st_S$ and $st'_S$ of the key distribution device S are stored in a storage of the key distribution device S, a secret key $sk_i$ for public key encryption and secret strings $st_i$ and $st'_i$ of the communication devices $U_i$ are stored in a storage of the communication devices $U_i$ (i=1, ..., n+k), and further, information r generated in the session established by the communication devices $U_1$, ..., $U_n$ is stored in a storage of the communication devices $U_1$, ..., $U_n$, exchange method including: a first key generation step in which the communication devices $U_i$ (i=1, n, ..., n+k) generate $r_i$, $k_i$, and $s_i$ by using the secret strings $st_i$ and $st'_i$ based on a twisted pseudo-random function, compute $R_i=g^{r_i}$ and $c_i=g^{k_i}h^{s_i}$, and transmit ($R_i$, $c_i$) to the key distribution device S, and the communication devices $U_i$ (i=2, ..., n−1) generate $k_i$ and $s_i$ by using the secret strings $st_i$ and $st'_i$ based on the twisted pseudo-random function, compute $c_i=g^{k_i}h^{s_i}$, and transmit $c_i$ to the key distribution device S; a session ID generation step in which the key distribution device S generates sid by using $c_1$, ..., $c_{n+k}$ based on a target-collision resistant hash function and transmits, to the communication devices $U_i$, (sid, $R_{i-1}$) with respect to i=1, 2, sid with respect to i=3, ..., n−2, (sid, $R_{i+1}$) with respect to i=n−1, n, and (sid, $R_{i-1}$, $R_{i+1}$) with respect to i=n+1, ..., n+k (here, $R_0=R_{n+K}$ and $R_{n+k+1}=R_1$); a second key generation step in which the representative communication device $U_1$ generates $K_1^l$ by using (sid, $R_{n+k}^{r1}$) based on a pseudo-random function, generates $K_1^r$ by using (sid, $g^{r1r}$) based on the pseudo-random function, computes $T_1$ by an exclusive OR of $K_1^l$ and $K_1^r$, computes T' by an exclusive OR of $K_1^l$ and $k_1\|s_1$, and transmits ($T_1$, T') to the key distribution device S, the communication device $U_2$ generates $K_2^l$ by using (sid, $R_1^r$) based on the pseudo-random function, generates $K_2^r$ by using (sid, $g^r$) based on the pseudo-random function, computes $T_2$ by an exclusive OR of $K_2^l$ and $K_2^r$, and transmits ($k_2$, $s_2$, $T_2$) to the key distribution device S, the communication devices $U_i$ (i=3, ..., n−2) transmit ($k_i$, $s_i$) to the key distribution device S, the communication device $U_{n-1}$ generates $K_{n-1}^l$ by using (sid, $g^r$) based on the pseudo-random function, generates $K_{n-1}^r$ by using (sid, $R_n^r$) based on the pseudo-random function, computes $T_{n-1}$ by an exclusive OR of $K_{n-1}^l$ and $K_{n-1}^r$, and transmits ($k_{n-1}$, $s_{n-1}$, $T_{n-1}$) to the key distribution device S, the communication device $U_n$ generates $K_n^l$ by using (sid, $R_n^r$) based on the pseudo-random function, generates $K_n^r$ by using (sid, $R_{n+1}^{rn}$) based on the pseudo-random function, computes $T_n$ by an exclusive OR of $K_n^l$ and $K_n^r$, and transmits ($k_n$, $s_n$, $T_n$) to the key distribution device S, and the communication devices $U_i$ (i=n+1, ..., n+k) generate $K_i^l$ by using (sid, $R_{i-1}^{ri}$) based on the pseudo-random function, generate $K_i^r$ by using (sid, $R_{i+1}^{ri}$) based on the pseudo-random function, compute $T_i$ by an exclusive OR of $K_i^l$ and $K_i^r$, and transmit ($k_i$, $s_i$, $T_i$) to the key distribution device S; a third key generation step in which the key distribution device S generates $k_s$ by using the secret strings $st_S$ and $st'_S$ based on the twisted pseudo-random function, computes k' by an exclusive OR of $k_2$, ..., $k_{n+k}$, $k_s$, computes $T'_i$ by an exclusive OR of $T_1$, ..., $T_{i-1}$ with respect to i=2, ..., n+k (here, $T_i$ is nil with respect to i=3, ..., n−1), transmits k' to the representative communication device $U_1$, and transmits (k', $T'_i$, T') to the communication devices $U_i$ (i=2, ..., n+k); a first session key generation step in which the communication devices $U_i$ (i=2, ... n, n+k) compute $K_1^l$ by an exclusive OR of $T'_i$ and $K_i^l$ and compute $k_1\|s_1$ by an exclusive OR of T' and $K_1^l$, and the communication devices $U_i$ (i=3, ..., n−1) compute $K_1^l$ by an exclusive OR of $T'_i$ and $g^r$ and compute $k_1\|s_1$ by the exclusive OR of T' and $K_1^l$; and a second session key generation step in which the communication devices $U_i$ (i=1, ..., n+k) generate a common key $K_2$ by using sid and an exclusive OR of k' and $k_1$ based on the pseudo-random function.

Further, a key exchange method according to the present invention is the key exchange method for a case where, in a key exchange system which includes a key distribution device S and n pieces (here, n is an integer which is 2 or larger) of communication devices $U_i$ (i=1, ..., n), communication devices $U_{j1}$, ..., $U_{jm}$ leave from a session established by communication devices $U_1, \ldots, U_n$, in which $R=\{U_{j1}, \ldots, U_{jm}\}$ is a subset of $\{U_1, \ldots, U_n\}$ and $N=\{U_{j1-1}, U_{j1+1}, \ldots, U_{jm-1}, U_{jm-1}\}$ is a subset of $\{U_1, \ldots, U_n\}$, $\|$ is a concatenation operator, $U_1$ ($\in N$) is one piece of representative communication device which is selected from N, a secret key $sk_S$ for public key encryption and secret strings $st_S$ and $st'_S$ of the key distribution device S are stored in a storage of the key distribution device S, and a secret key $sk_i$ for public key encryption and secret strings $st_i$ and $st'_i$ of the communication devices $U_i$ and information $H_i^l$ and $H_i^r$ generated in the session established by the communication devices $U_1, \ldots, U_n$ are stored in a storage of the communication devices $U_i$ (i=1, ..., n), the key exchange method including: a first key generation step in which the communication devices $U_i(\in N)$ generate $r_i$, $k_i$, and $s_i$ by using the secret strings $st_i$ and $st'_i$ based on a twisted pseudo-random function, compute $R_i=g^{r_i}$ and $c_i=g^{k_i}h^{s_i}$, and transmit ($R_i$, $c_i$) to the key distribution device S, and the communication devices $U_i(\in(\{U_1, \ldots, U_n\}-R)-N)$ generate $k_i$ and $s_i$ by using the secret strings $st_i$ and $st'_i$ based on the twisted pseudo-random function, compute $c_i=g^{k_i}h^{s_i}$, and transmit $c_i$ to the key distribution device S; a session ID generation step in which the key distribution device S generates sid by using $\{c_i|$i satisfies $U_i\in\{U_1, \ldots, U_n\}-R\}$ based on a target-collision resistant hash function and transmits, to the communication devices $U_i$, (sid, $R_j$) with respect to i which satisfies $U_i\in N$ and $U_{i+1}\in R$ (here, j is a minimum index which satisfies $U_j\in N$ and j>i), (sid, $R_{j'}$) with respect to i which satisfies $U_i\in N$ and $U_{i-1}\in R$ (here, j' is a maximum index which satisfies $U_j\in N$ and j'<i), and sid with respect to i which satisfies $U_i\in(\{U_1, \ldots, U_n\}-R)-N$; a second key generations step in which the representative communication device $U_1$ generates $K_1^l$ by using (sid, $R_{n-1}^{r1}$) based on a pseudo-random function, generates $K_1^r$ by using (sid, $R_3^{r1}$) based on the pseudo-random function, computes $T_1$ by an exclusive OR of $K_1^l$ and $K_1^r$, computes T' by an exclusive OR of $K_1^l$ and $k_1\|s_1$, and transmits ($T_1$, T') to the key distribution device S in a case where $U_j=U_3$ and $U_{j'}=U_{n-1}$ are satisfied, generates $K_1^l$ by using (sid, $R_{n-1}^{r1}$) based on the pseudo-random function, generates $K_1^r$ by using (sid, $H_1^r$) based on the pseudo-random function, computes $T_1$ by the exclusive OR of $K_1^l$ and $K_1^r$, computes T' by the exclusive OR of $K_1^l$ and $k_1\|s_1$, and transmits ($T_1$, T') to the key distribution device S in a case where $U_j=U_{n-1}$ and $U_2\in N$ are satisfied, and generates $K_1^l$ by using (sid, $H_1^l$) based on the pseudo-random function, generates $K_1^r$ by using (sid, $R_3^{r1}$) based on the pseudo-random function, computes $T_1$ by the exclusive OR of $K_1^l$ and $K_1^r$, computes T' by the exclusive OR of $K_1^l$ and $k_1\|s_1$, and transmits ($T_1$, T') to the key distribution device S in a case where $U_j=U_3$ and $U_n\in N$ are satisfied, the communication devices $U_i$ (i satisfies $U_i\in N$ and $U_{i+1}\in R$ (here, i is not 1)) generate $K_i^l$ by using (sid, $H_i^l$) based on the pseudo-random function, generate $K_i^r$ by using (sid, $R_j^{ri}$) based on the pseudo-random function, compute $T_i$ by an exclusive OR of $K_i^l$ and $K_i^r$, and transmit ($k_i$, $s_i$, $T_i$) to the key distribution device S, the communication devices $U_i$ (i satisfies $U_i\in N$ and $U_{i-1}\in R$ (here, i is not 1)) generate $K_i^l$ by using (sid, $R_j^{ri}$) based on the pseudo-random function, generate $K_i^r$ by using (sid, $H_i^r$) based on the pseudo-random function, compute $T_i$ by the exclusive OR of $K_i^l$ and $K_i^r$, and transmit ($k_i$, $s_i$, $T_i$) to the key distribution device S, and the communication devices U (i satisfies $U_i\in(\{U_1, \ldots, U_n\}-R)-N$ (here, i is not 1)) generate $K_i^l$ by using (sid, $H_i^l$) based on the pseudo-random function, generate $K_i^r$ by using (sid, $H_i^r$) based on the pseudo-random function, compute $T_i$ by the exclusive OR of $K_i^l$ and $K_i^r$, and transmit ($k_i$, $s_i$, $T_i$) to the key distribution device S; a third key generation step in which the key distribution device S generates $k_s$ by using the secret strings $st_S$ and $st'_S$ based on the twisted pseudo-random function, computes k' by an exclusive OR of $\{k_i|$i satisfies $U_i\in(\{U_1, \ldots, U_n\}-R)-\{U_1\}\}$ and $k_s$, computes $T'_i$ by an exclusive OR of $T_1, \ldots, T_j, \ldots, T_{i-1}$ with respect to i which satisfies $U_i\in\{U_1, \ldots, U_n\}-R$ (here, $T_j$ is nil with respect to j which satisfies $U_j\in R$), transmits k' to the representative communication device $U_1$, and transmits (k', $T'_i$, T') to the communication devices $U_i(\in(\{U_1, \ldots, U_n\}-R)-\{U_1\})$; a first session key generation step in which the communication devices $U_i(\in(\{U_1, \ldots, U_n\}-R)-\{U_1\})$ compute $K_1^l$ by an exclusive OR of $T'_1$ and $K_i^l$ and compute $k_1\|s_1$ by an exclusive OR of T' and $K_1^l$; and a second session key generation step in which the communication devices $U_i(\in\{U_1, \ldots, U\}-R)$ generate the common key $K_2$ by using sid and the exclusive OR of k' and $k_1$ based on the pseudo-random function.

According to the present invention, a plurality of users can share a common key while permitting dynamic member change. Computational complexity required for key exchange is the constant number of times which is the number of users, that is, O(1), thus being reduced more than the related art.

DETAILED DESCRIPTION OF THE EMBODIMENT

Figure 1:
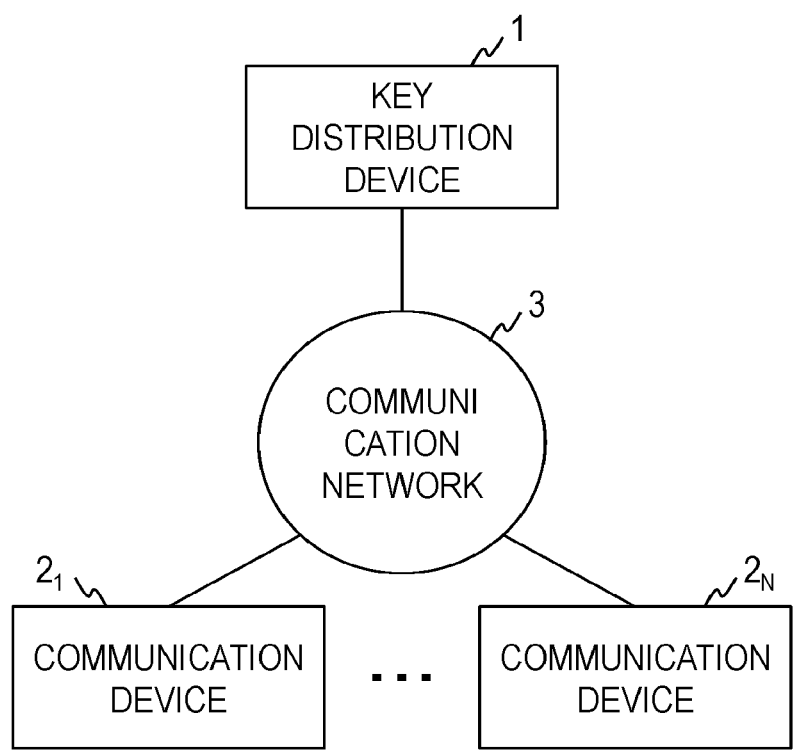
FIG. 1 illustrates the functional configuration of a key exchange system.

Prior to the description of an embodiment, the notation in this specification will be described.

To select an element m at random from Set which is a certain set is expressed as $m\in_R$Set.

To output y based on ALG, which is a certain algorithm, with respect to an input x and a random number r is expressed as $y\leftarrow$ALG(x;r). Here, in the case where ALG is a deterministic algorithm, the random number r is nil.

|•| denotes the bit length of a value •.

κ denotes a security parameter.

$F=\{F_\kappa: \text{Dom}_\kappa\times FS_\kappa\rightarrow \text{Rng}_\kappa\}_\kappa$ is a family of functions including a definition range $\{\text{Dom}_\kappa\}_\kappa$, a key space $\{FS_\kappa\}_\kappa$, and a value range $\{\text{Rng}_\kappa\}_\kappa$. In this case, if a function $F_\kappa$ and a true random function $RF_\kappa: \text{Dom}_\kappa\rightarrow\text{Rng}_\kappa$ cannot be distinguished with respect to a person D to be identified at arbitrary polynomial time, $F=\{F_\kappa\}_\kappa$ is called a family of pseudo-random functions. A specific example of the pseudo-random function is described in Reference literature 1 "O. Goldreich, "Modern Cryptography, Probabilistic Proofs and Pseudo-randomness", Springer-Verlag Tokyo, 2001", for example.

$H=\{H_\kappa: \text{Dom}_\kappa\rightarrow\text{Rlig}_\kappa\}_\kappa$ is a family of hash functions including the definition range $\{\text{Dom}_\kappa\}_\kappa$ and the value range $\{Rng_\kappa\}_\kappa$. In this case, if x' ($\neq$x) which satisfies $H_\kappa(x)=H_\kappa(x')$ when $x\in_R Dom_\kappa$ is provided cannot be found with respect to an attacker A at arbitrary polynomial time, $H=\{H_\kappa\}_\kappa$ is called a family of target-collision resistant hash functions. A specific example of the target-collision resistant hash function is described in Reference literature 2 "J. A. Buchmann, "Introduction to Cryptography—Edition 3", Maruzen Publishing Co., Ltd., 2007", for example.

Public key encryption algorithms are defined as (Gen, Enc, Dec). In a key generation algorithm Gen, a security parameter $\kappa$ is an input and a public key pk and a secret key sk are outputs. In an encryption algorithm Enc, the public key pk and a plaintext in are inputs and a cipher text CT is an output. In the decryption algorithm Dec, the secret key sk and the cipher text CT are inputs and the plaintext m is an output. A specific example of the public key encryption algorithm is described in Reference literature 2 mentioned above, for example.

Message authentication code algorithms are defined as (MGen, Tag, Ver). In a MAC key generation algorithm MGen, the security parameter $\kappa$ is an input and a MAC key ink is an output. In the tag generation algorithm Tag, the MAC key ink and the plaintext in are inputs and the authentication tag $\sigma$ is an output. In a verification algorithm Ver, the MAC key mk, the plaintext in, and the authentication tag $\sigma$ are inputs, and 1 is outputted when the authentication tag $\sigma$ is correct, while 0 is outputted when the authentication tag $\sigma$ is incorrect. A specific example of the message authentication code algorithm is described in Reference literature 2 mentioned above, for example.

Functional encryption algorithms are defied as (Setup, Der, FEnc, FDec). In a setup algorithm Setup, the security parameter $\kappa$ is an input and a master secret key msk and a public parameter Params are outputs. In a key derivation algorithm Der, the public parameter Params, the master secret key msk, and attribution A are inputs and a user secret key usk is an output. In an encryption algorithm FEnc, the public parameter Params, an access structure P, and the plaintext in are inputs and the cipher text CT is an output. In a decryption algorithm FDec, the user secret key usk and the cipher text CT are inputs and the plaintext m is outputted if the attribution A satisfies the access structure P. A specific example of the functional encryption algorithm is described in Reference literature 3 "D. Boneh, A. Sahai, and B. Waters, "Functional encryption: definitions and challenges", TCC, Lecture Notes in Computer Science, vol. 6597, pp. 253-273, 2011", for example.

A function tPRF: $\{0, 1\}^\kappa \times FS_\kappa \times \{0, 1\}^\kappa \times FS_\kappa \to Rng_\kappa$ is called a twisted pseudo-random function, and $$tPRF(a,a',b,b'):=F_\kappa(a,b)\oplus F_\kappa(b',a')$$

is defined by using the pseudo-random function $F_\kappa$. Here, a, b'$\in\{0, 1\}^\kappa$ and a', b$\in FS_\kappa$. A specific example of the twisted pseudo-random function is described in Reference literature 4 "Kazuki Yoneyama, "One-Round Authenticated Key Exchange with Strong Forward Secrecy in the Standard Model against Constrained Adversary", IEICE Transactions, vol. E96-A, no. 6, pp. 1124-1138, 2013", for example.

An embodiment of the present invention will be detailed below. Components having identical functions in the drawings will be denoted by identical reference characters and duplicate description thereof will be omitted.

<System Structure>

As illustrated in FIG. 1, the key exchange system according to the embodiment includes a key distribution device 1 and N ($\geq$2) pieces of communication devices $2_1, \ldots, 2_N$. In this embodiment, the key distribution device 1 and the communication devices $2_1, \ldots, 2_N$ are respectively connected to a communication network 3. The communication network 3 is a communication network adopting the circuit switching system or the packet switching system which is configured so that the key distribution device 1 can communicate with each of the communication devices $2_1, \ldots, 2_N$. In this embodiment, the communication devices $2_1, \ldots, 2_N$ do not have to be able to communicate with each other. The communication network 3 does not have to be a communication path in which safety is ensured but an internet or the like, for example, can be employed as the communication network 3.

Figures 2A, 2B:
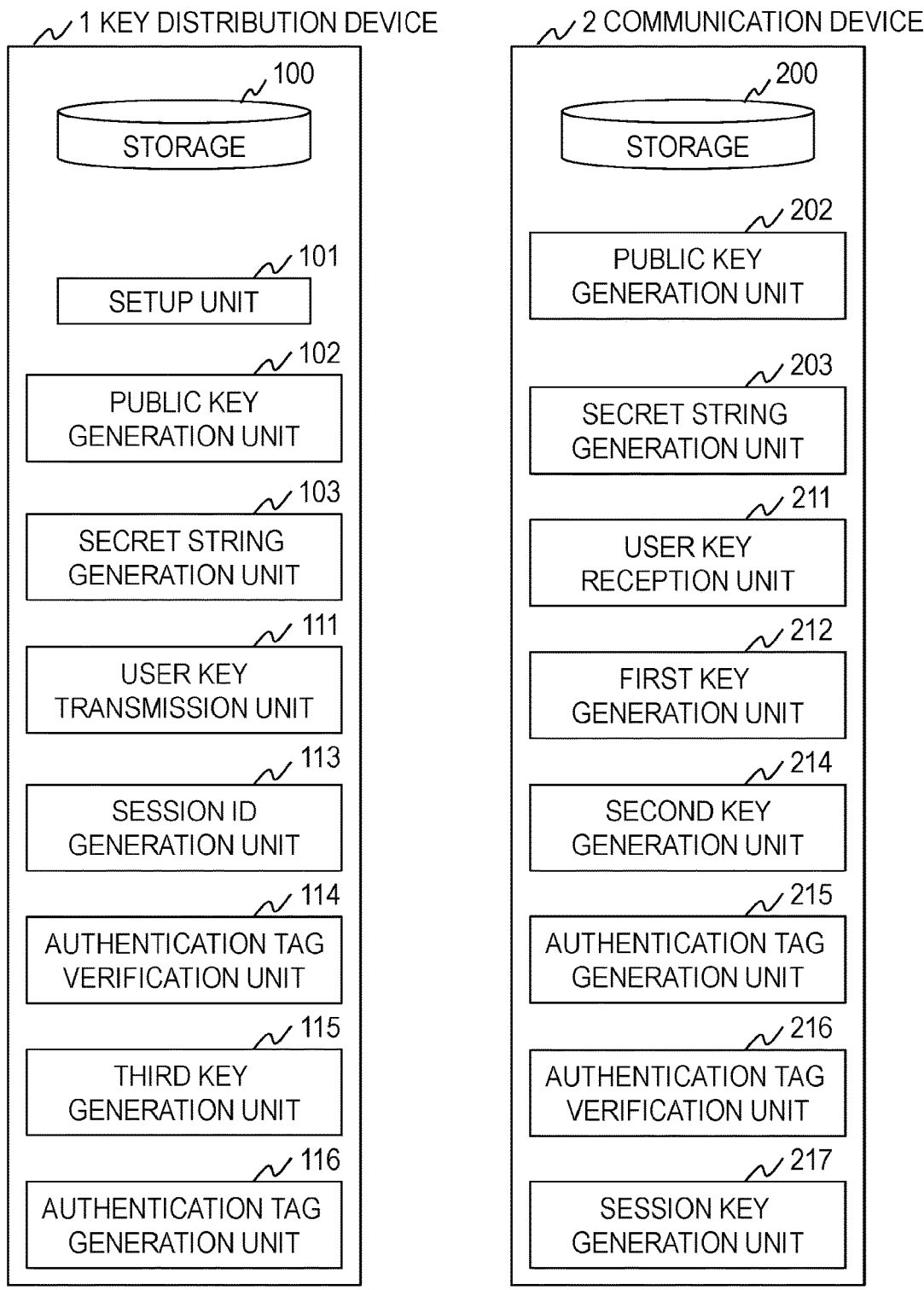
FIG. 2A illustrates the functional configuration of a key distribution device.
FIG. 2B illustrates the functional configuration of a communication device.

The key distribution device 1 includes a storage 100, a setup unit 101, a public key generation unit 102, a secret string generation unit 103, a user key transmission unit 111, a session ID generation unit 113, an authentication tag verification unit 114, a third key generation unit 115, and an authentication tag generation unit 116, as illustrated in FIG. 2A. The communication device 2 includes a storage 200, a public key generation unit 202, a secret string generation unit 203, a user key reception unit 211, a first key generation unit 212, a second key generation unit 214, an authentication tag generation unit 215, an authentication tag verification unit 216, and a session key generation unit 217, as illustrated in FIG. 2B. The key distribution device 1 and the communication devices $2_1, \ldots, 2_N$ perform processing of each step illustrated in FIGS. 3, 4, 5, and 6, realizing the key exchange method according to the embodiment.

The key distribution device 1 and the communication devices $2_1, \ldots, 2_N$ are special devices which are configured such that a special program is read into well-known or dedicated computers including a central processing unit (CPU), a main storage device (random access memory: RAM), and the like. Each device executes processing under the control of the CPU, for example. Data inputted into each device and data obtained through each processing are stored in the main storage device, for example, and the data stored in the main storage device is read onto the CPU as appropriate to be used for other processing. At least part of processing units included in each device may be composed of hardware such as an integrated circuit.

The storage 100 included in the key distribution device 1 and the storage 200 included in the communication devices $2_1, \ldots, 2_N$ may be composed of a main storage device such as a random access memory (RAM), an auxiliary storage device composed of a hard disk, an optical disk, or a semiconductor memory element such as a flash memory, or middleware such as a relational database and a key value store. Since each storage stores secret information, it is preferable that each storage is a storage device having tamper resistance (a SIM card, for example).

<System Setup>

Figure 3:
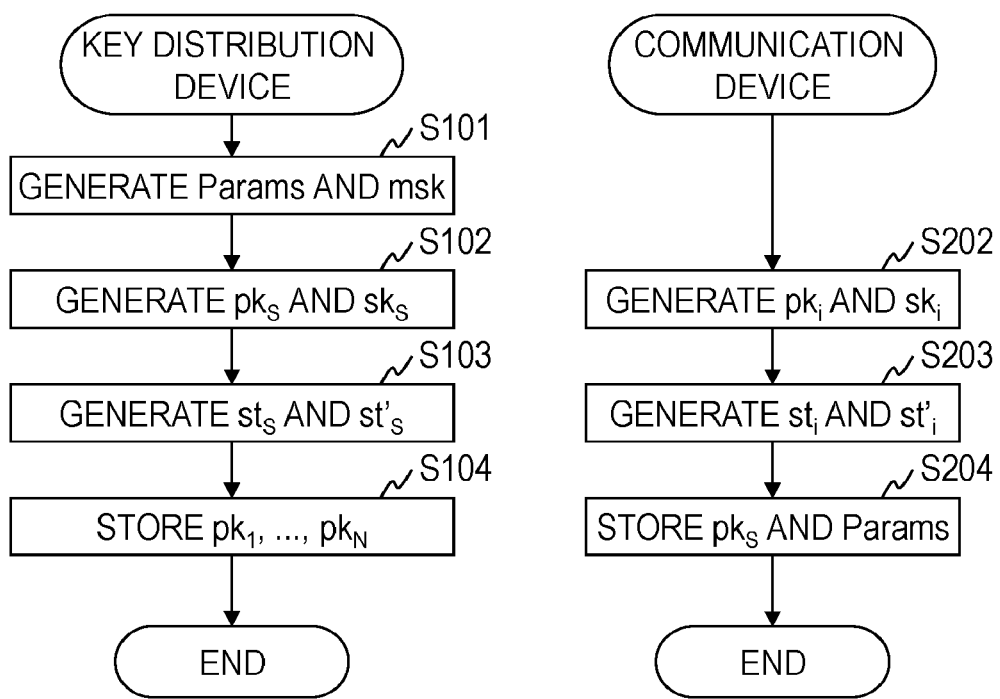
FIG. 3 illustrates a processing flow (system set-up) in a key exchange method.

A processing procedure for system setup in the key exchange method according to the embodiment will be described with reference to FIG. 3.

In the following description, symbols will be defined as the following. S denotes the key distribution device 1 and $U_i$($i\in\{1, \ldots, N\}$) denote N pieces of communication devices $2_1, \ldots, 2_N$. G denotes a multiplication cyclic group of a prime number order p of $\kappa$ bits. Each of g and h denotes a generation source of the group G H: $\{0, 1\}^* \to \{0, 1\}^K$ denotes a target-collision resistant hash function. tPRF: $\{0, 1\}^\kappa \times FS_\kappa \times \{0, 1\}^\kappa \times FS_\kappa \to Z_p$ and tPRF': $\{0, 1\}^\kappa \times FS_\kappa \times \{0, 1\}^\kappa \times FS_\kappa \to FS_\kappa$ denote twisted pseudo-random functions. F: $\{0, 1\}^\kappa \times G \to Z_p^2$, F': $\{0, 1\}^\kappa \times Z_p \to FS_\kappa$, and F'': $\{0, 1\}^\kappa \times FS_\kappa \to \{0, 1\}^\kappa$ denote pseudo-random functions.

In step S101, the setup unit 101 of the key distribution device S generates the public parameter Params and the master secret key msk based on the setup algorithm Setup for functional encryption. The setup unit 101 transmits the public parameter Params to each of the communication devices $U_1, \ldots, U_N$. The master secret key msk is stored in the storage 100.

In step S102, the public key generation unit 102 of the key distribution device S generates a combination of the public key $pk_S$ and the secret key $sk_S$ of the key distribution device S based on the key generation algorithm Gen for public key encryption. The public key $pk_S$ of the key distribution device S is made public by using a public key infrastructure or the like, for example. The secret key $sk_S$ of the key distribution device S is stored in the storage 100.

In step S202, the public key generation unit 202 of the communication devices $U_i$ generates a combination of the public key $pk_i$ and the secret key $sk_i$ of the communication device $U_i$ based on the key generation algorithm Gen for public key encryption. The public key $pk_i$ of the communication devices $U_i$ is made public by using a public key infrastructure or the like, for example. The secret key $sk_i$ of the communication devices $U_i$ is stored in the storage 200.

In step S103, the secret string generation unit 103 of the key distribution device S generates secret strings $(st_S, st'_S)$ used in the twisted pseudo-random function as $st_S \in_R FS_\kappa$ and $st'_S \in \{0, 1\}_\kappa$. The secret strings $(st_S, st'_S)$ are stored in the storage 100.

In step S203, the secret string generation unit 203 of the communication devices $U_i$ generates secret strings $(st_i, st'_i)$ used in the twisted pseudo-random function as $st_i \in_R FS_\kappa$ and $st'_i \in \{0, 1\}_\kappa$. The secret strings $(st_i, st'_i)$ are stored in the storage 200.

In step S104, the key distribution device S acquires public keys $pk_1, \ldots, pk_N$ of respective communication devices $U_1, \ldots, U_N$ from a public key infrastructure or the like, for example, so as to store the public keys $pk_1, \ldots, pk_N$ in the storage 100.

In step S204, the communication devices $U_i$ acquire the public key $pk_S$ of the key distribution device S from a public key infrastructure or the like, for example, so as to store the public key $pk_S$ in the storage 200. Further, the communication devices $U_i$ store the public parameter Params, which is received from the key distribution device S, in the storage 200.

<Session Key Distribution>

Figure 4:
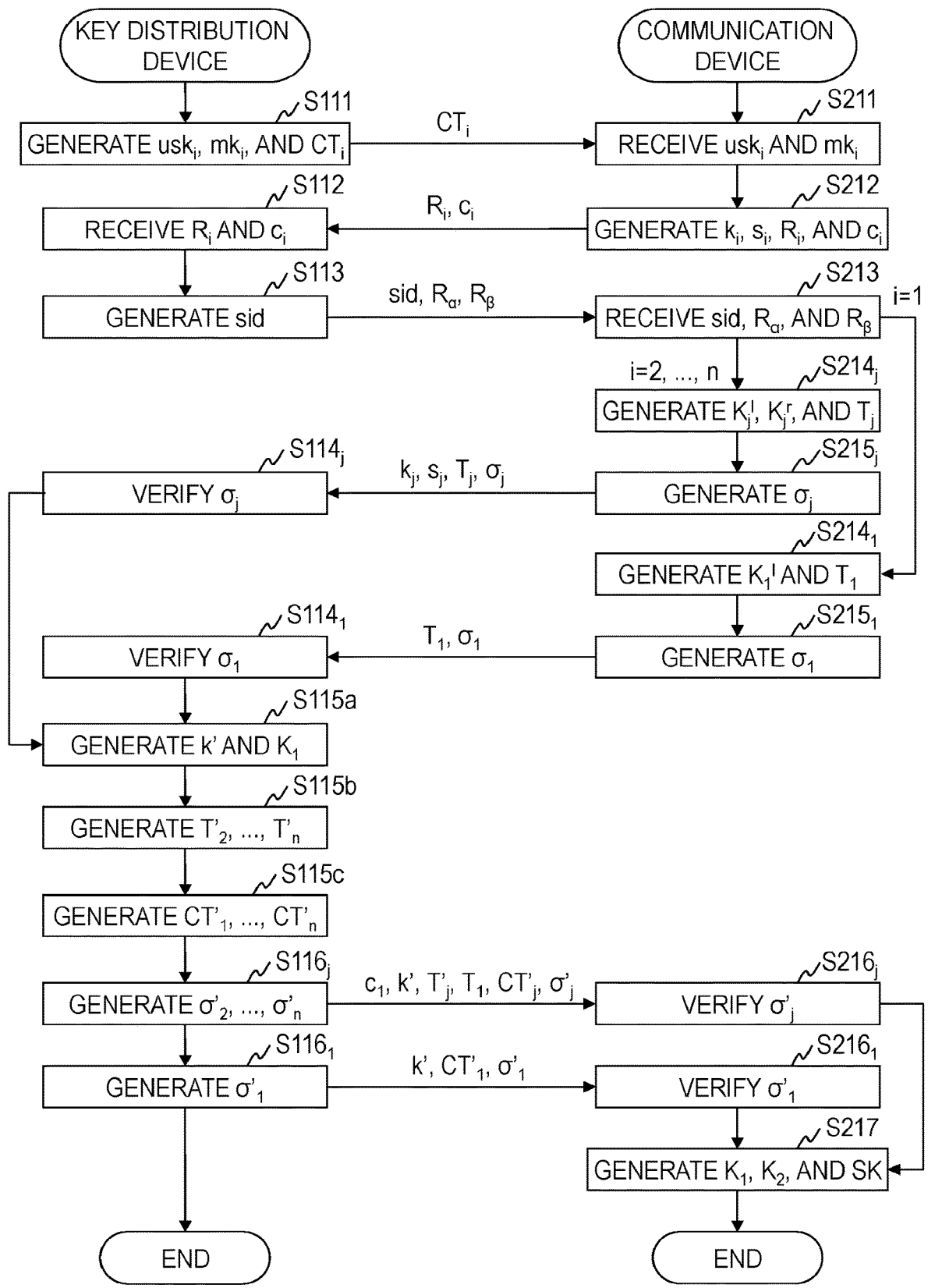
FIG. 4 illustrates a processing flow (session key distribution) in the key exchange method.

A processing procedure for session key distribution in the key exchange method according to the embodiment will be described with reference to FIG. 4.

In the following description, it is assumed that arbitrary n ($\leq N$) pieces of communication devices $U_i (i \in \{1, \ldots, n\})$ among N pieces of communication devices $2_1, \ldots, 2_N$ share a session key SK. In the case where S and $U_i$ are inputs of each algorithm, S and $U_i$ are identifiers for uniquely specifying respective devices.

In step S111, in the case where a session is started by the communication devices $U_i$ ($i \in \{1, \ldots, n\}$) and the session is the first session in a time frame TF of the communication devices U the user key transmission unit 111 of the key distribution device S generates a user secret key $usk_i \leftarrow Der$ (Params, msk, $A_i$) of the communication devices $U_i$ based on the key derivation algorithm Der for functional encryption with current time and attribution respectively used as time and $A_i = (U_i, \text{time})$. Further, the user key transmission unit 111 generates a MAC key $mk_i \leftarrow MGen$ of the communication devices $U_i$ based on the key generation algorithm MGen for a message authentication code. Then, the user key transmission unit 111 encrypts the user secret key $usk_i$ and the MAC key $mk_i$ by using the public key $pk_i$ of the communication devices $U_i$ based on the encryption algorithm Enc for public key encryption so as to generate the cipher text $CT_i \leftarrow Enc_{pk_i}(usk_i, mk_i)$. The user key transmission unit 111 transmits the cipher text $CT_i$ to each of the communication devices $U_i$.

In step S211, the user key reception unit 211 of the communication devices $U_i$ decrypts the cipher text $CT_i$, which is received from the key distribution device S, by using the secret key $sk_i$ of the communication devices $U_i$ based on the decryption algorithm Dec for public key encryption so as to obtain a user secret key and a MAC key $(usk_i, mk_i) \leftarrow Dec_{sk_i}(CT_i)$. The user key reception unit 211 stores the user secret key $usk_i$ and the MAC key $mk_i$ in the storage 200.

In step S212, the first key generation unit 212 of the communication devices $U_i$ generates $\sim r_i \in_R \{0, 1\}^\kappa$, $\sim r'_i \in_R FS_\kappa$, $\sim k_i \in_R \{0, 1\}^\kappa$, $\sim k'_i \in_R FS_\kappa$, $\sim s_i \in_R \{0, 1\}^\kappa$, and $\sim s'_i \in_R FS_\kappa$ and computes $r_i = tPRF(\sim r_i, \sim r'_i, st_i, st'_i)$, $k_i = tPRF(\sim k_i, \sim k'_i, st_i, st'_i)$, and $s_i = tPRF(\sim s_i, \sim s'_i, st_i, st'_i)$ based on the twisted pseudo-random function tPRF. Further, the first key generation unit 212 computes $R_i = g^{r_i}$ and $c_i = g^{k_i} h^{s_i}$. Then, the first key generation unit 212 transmits $(R_i, c_i)$ to the key distribution device S.

In step S112, the key distribution device S receives $(R_i, c_i)$ from the communication devices $U_i$. At this time, the key distribution device S stands by until the key distribution device S receives $(R_1, c_1), (R_n, c_n)$ respectively from all of the communication devices $U_1, \ldots, U_n$.

In step S113, the session ID generation unit 113 of the key distribution device S generates $sid = H(c_1, \ldots, c_n)$ by using $c_1, \ldots, c_n$, which are respectively received from the communication devices $U_1, \ldots, U_n$, based on the target-collision resistant hash function H. Further, one piece of communication device is selected as a representative from n pieces of communication devices $U_1, \ldots, U_n$. A representative may be arbitrarily selected. For example, a predetermined communication device with the highest priority or a communication device which has started a session most recently may be selected. It is assumed that the communication device $U_1$ is selected, and $U_1$ is called a representative communication device in this example. Further, n−1 pieces of communication devices $U_j (j \in \{2, \ldots, n\})$ other than the representative communication device $U_1$ are called general communication devices. The session ID generation unit 113 computes $\alpha$ and $\beta$ as the following formulas and transmits $(sid, R_\alpha, R_\beta)$ to each of the communication devices $U_i$.

$$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases}$$

In step S213, each of the communication devices $U_i$ receives $(sid, R_\alpha, R_\beta)$ from the key distribution device S. The communication devices $U_i$ execute the following processing as soon as the communication devices $U_i$ receive $(sid, R_\alpha, R_\beta)$. In the case where $i=2, \ldots, n$ holds, that is, the case where the communication devices $U_i$ are the communication devices $U_j$ ($i=j$), the processing is progressed to step $S214_j$. In the case where $i=1$ holds, that is, the case where the communication device $U_i$ is the representative communication device $U_1$, the processing is progressed to step $S214_1$.

In step S214$_j$, the second key generation unit 214 of the general communication devices $U_j$ ($j \in \{2, \ldots, n\}$) generates $K_i^l$ by using (sid, $R_\alpha^{rj}$) based on the pseudo-random function F and generates $K_j^r$ by using (sid, $R_\beta^{rj}$) based on the pseudo-random function F so as to compute $T_j$ by an exclusive OR of $K_j^l$ and $K_j^r$, as the following formulas.

$$K_j^l = F(sid, R^{rj}_\alpha),$$

$$K_j^r = F(sid, R^{rj}_\beta),$$

$$T_j = K_j^l \oplus K_j^r.$$

In step S215$_j$, the authentication tag generation unit 215 of the general communication devices $U_j$ generates an authentication tag $\sigma_j = \text{Tag}_{mkj}(R_j, c_j, R_\alpha, R_\beta, k_j, s_j, T_j, U_j, sid)$ by using the MAC key $mk_j$ based on the tag generation algorithm Tag for a message authentication code. The authentication tag generation unit 215 transmits $(k_j, s_j, T_j, \sigma_j)$ to the key distribution device S.

In step S214$_1$, the second key generation unit 214 of the representative communication device $U_1$ generates $K_1^l$ by using (sid, $R_n^{r1}$) based on the pseudo-random function F so as to compute $T_1$ by an exclusive OR of $K_1^l$ and $k_1 \| s_1$, as the following formulas. Here, $\|$ denotes a concatenation operator.

$$K_1^l = F(sid, R_n^{r1}),$$

$$T_1 = K_1^l \oplus k_1 \| s_1$$

In step S215$_1$, the authentication tag generation unit 215 of the representative communication device $U_1$ generates an authentication tag $\sigma_i = \text{Tag}_{mk1}(R_1, c_1, R_n, R_2, T_1, U_1, sid)$ by using the MAC key $mk_1$ based on the tag generation algorithm Tag for a message authentication code. The authentication tag generation unit 215 transmits $(T_1, \sigma_1)$ to the key distribution device S.

In step S114$_j$, the authentication tag verification unit 114 of the key distribution device S receives $(k_j, s_j, T_j, \sigma_j)$ from the general communication devices $U_j$ with respect to $j=2, \ldots, n$ and verifies $\text{Ver}_{mkj}(R_j, c_j, R_\alpha, R_\beta, k_j, s_j, T_j, U_j, sid, \sigma_j)$ by using the MAC key $mk_j$ of the general communication devices $U_j$ based on the verification algorithm Ver for a message authentication code. When the authentication tag $\sigma_j$ is invalid, the authentication tag verification unit 114 ends the session of the general communication devices $U_j$. Further, the authentication tag verification unit 114 verifies whether or not $c_j = g^{kj} h^{sj}$ is satisfied with respect to $j=2, n$. When $c_j = g^{kj} h^{sj}$ is not satisfied, the authentication tag verification unit 114 ends the session of the general communication devices $U_j$.

In step S114$_1$, the authentication tag verification unit 114 of the key distribution device S receives $(T_1, \sigma_1)$ from the representative communication device $U_1$ and verifies $\text{Ver}_{mk1}(R_1, c_1, R_n, R_2, T_1, U_1, sid, \sigma_1)$ by using the MAC key $mk_1$ of the representative communication device $U_1$ based on the verification algorithm Ver for a message authentication code. When the authentication tag $\sigma_1$ is invalid, the authentication tag verification unit 114 ends the session of the representative communication device $U_1$.

In step S115a, the third key generation unit 115 of the key distribution device S generates $\sim k_S \in_R \{0,1\}^\kappa$, $\sim k'_S \in_R FS_\kappa$, $\sim K_1 \in_R \{0,1\}^\kappa$, and $\sim K'_1 \in_R FS_\kappa$ so as to compute $k_S = \text{tPRF}(\sim k_S, \sim k'_S, st_S, st'_S)$ and $K_1 = \text{tPRF}(\sim K_1, \sim K'_1, st_S, st'_S)$ based on the twisted pseudo-random function tPRF. Further, the third key generation unit 115 computes k' by the following formula.

$$k' = (\oplus_{2 \le j \le n} k_j) \oplus k_S$$

In step S115b, the third key generation unit 115 of the key distribution device S computes $T'_j$ with respect to $j=2, \ldots, n$ by the following formula.

$$T'_j = \oplus_{1 \le i \le j-1} T_i$$

In step S115c, the third key generation unit 115 of the key distribution device S encrypts a common key $K_1$ with respect to $i=1, \ldots, n$ based on the encryption algorithm FEnc for functional encryption with the access structure $P_i = (ID = U_i)^\wedge (\text{time} \in TF)$ so as to generate a cipher text $CT'_i = \text{FEnc}(\text{Params}, P_i, K_1)$. Here, ID is a predicate variable representing a communication device and TF is a predicate variable representing a time frame of the communication device.

In step S116$_j$, the authentication tag generation unit 116 of the key distribution device S generates an authentication tag $\sigma'_j = \text{Tag}_{mkj}(R_j, c_j, R_\alpha, R_\beta, k_j, s_j, T_j, U_j, sid, c_1, k', T'_j, T_1, CT'_j)$ with respect to $j=2, n$ by using the MAC key $mk_j$ of the general communication devices $U_j$ based on the tag generation algorithm Tag for a message authentication code. The authentication tag generation unit 116 transmits $(c_1, k', T'_j, T_1, CT'_j, \sigma'_j)$ to the general communication devices $U_j$.

In step S116$_1$, the authentication tag generation unit 116 of the key distribution device S generates an authentication tag $\sigma'_1 = \text{Tag}_{mk1}(R_1, c_1, R_n, R_2, T_1, U_1, sid, k', CT'_1)$ by using the MAC key $mk_1$ of the representative communication device $U_1$ based on the tag generation algorithm Tag for a message authentication code. The authentication tag generation unit 116 transmits $(k', CT'_1, \sigma'_i)$ to the representative communication device $U_1$.

In step S216$_j$, the authentication tag verification unit 216 of the general communication devices $U_j$ ($j \in \{2, \ldots, n\}$) receives $(c_1, k', T'_j, T_1, CT'_j, \sigma'_j)$ from the key distribution device S and verifies $\text{Ver}_{mkj}(R_j, c_j, R_\alpha, R_\beta, k_j, s_j, T_j, U_j, sid, c_1, k', T'_j, T_1, CT'_j, \sigma'_3)$ by using the MAC key $mk_j$ of the general communication devices $U_j$ based on the verification algorithm Ver for a message authentication code. When the authentication tag $\sigma'_j$ is invalid, the authentication tag verification unit 216 ends the session of the general communication devices $U_j$. Further, the authentication tag verification unit 216 computes $K_1^l$ by an exclusive OR of $T'_j$ and $K_j^l$ and computes $k_1 \| s_1$ by an exclusive OR of $T_1$ and $K_1^l$, as the following formulas.

$$K_1^l = T'_j \oplus K_j^l,$$

$$k_1 \| s_1 = T_1 \oplus K_1^l$$

Then, the authentication tag verification unit 216 verifies whether or not $c_1 = g^{k1} h^{s1}$ is satisfied. When $c_1 = g^{k1} h^{s1}$ is not satisfied, the authentication tag verification unit 216 ends the session of the general communication devices $U_j$.

In step S216$_1$, the authentication tag verification unit 216 of the representative communication device $U_1$ receives $(k', CT'_1, \sigma'_1)$ from the key distribution device S and verifies $\text{Ver}_{mk1}(R_1, c_1, R_n, R_2, T_1, U_1, sid, k', CT'_1, \sigma'_1)$ by using the MAC key $mk_1$ of the representative communication device $U_1$ based on the verification algorithm Ver for a message authentication code. When the authentication tag $\sigma'_1$ is invalid, the authentication tag verification unit 216 ends the session of the representative communication device $U_1$.

In step S217, the session key generation unit 217 of the communication devices $U_i$ decrypts the common key $K_1 \leftarrow \text{FDec}_{uski}(CT'_i, P_i)$ by using the user secret key $usk_i$ of the communication devices $U_i$ based on the decryption algorithm FDec for functional encryption. Further, the session key generation unit 217 computes a common key $K_2$ based on the pseudo-random function F' as the following formula.

$$K_2 = F'(s\_id, k' \oplus k_1)$$

Then, the session key generation unit 217 computes a session key SK based on the pseudo-random function F''' as the following formula.

$$SK = F'''(sid, K_1) \oplus F'''(sid, K_2)$$

According to the key exchange technology of the present invention, the above-described configuration makes it unnecessary to preliminarily register information of users who perform key exchange as the related art, thus enabling a plurality of users to share a common key while permitting dynamic member change. Further, the whole computational complexity required for the key exchange has been O(log n) when the number of users is set as n in the related art, but according the present invention, the whole computational complexity is the constant number of times which is the number of users, that is, O(1), enabling key exchange with smaller computational complexity than the related art.

Here, the processing for guaranteeing integrity by using the message authentication code algorithm, that is, the processing for generation and verification of an authentication tag in S215$_j$, S215$_1$, S114$_j$, S114$_1$, S116$_j$, S116$_1$, S216$_j$, and S216$_1$ may be omitted.

Further, the communication devices U$_i$ are configured to generate two keys, that is, the common key K$_2$ and the session key SK from sid based on the pseudo-random function so as to share these two keys among the communication devices U$_i$. However, the communication devices U$_i$ may be configured to generate and share only the common key K$_2$.

Figure 5:
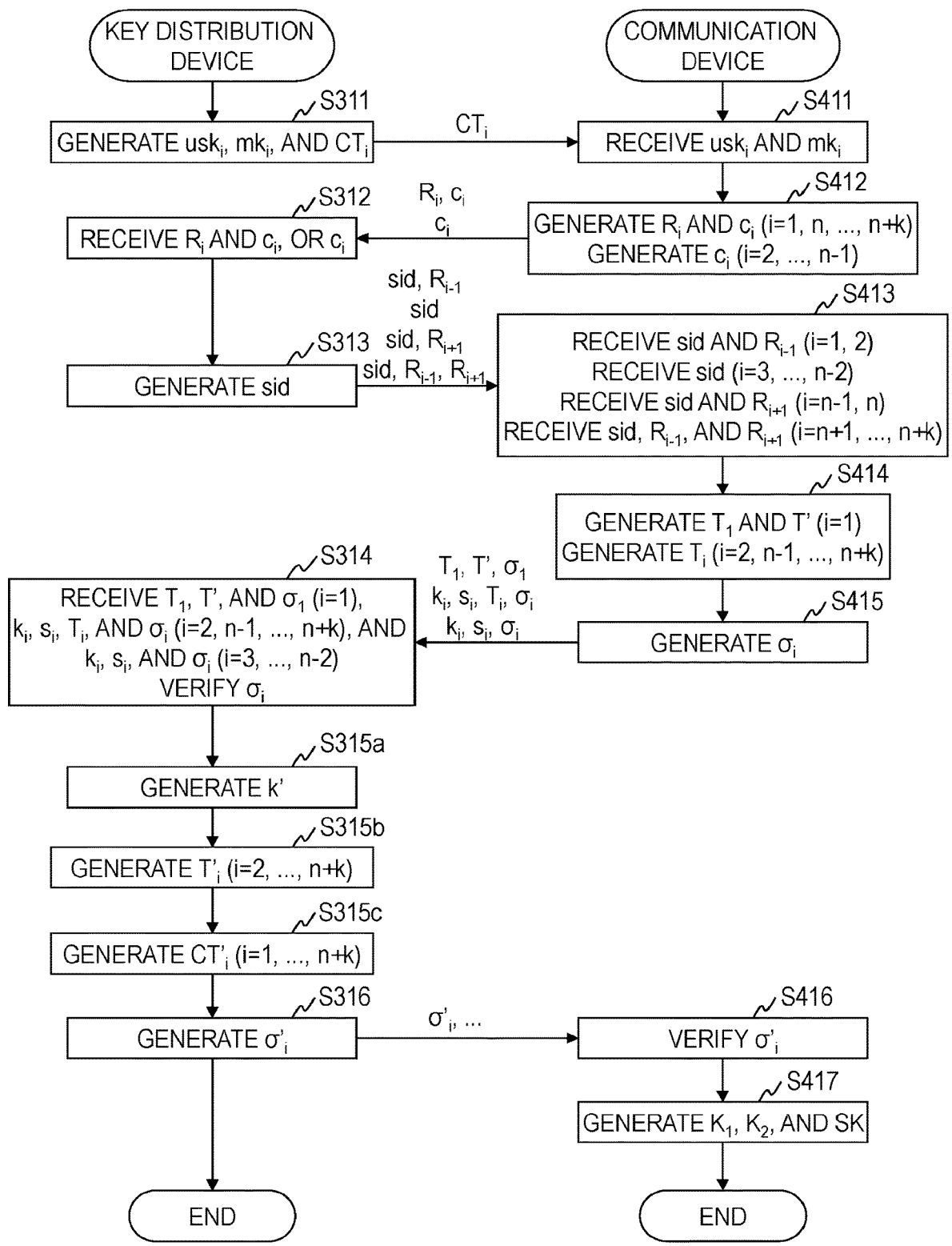
FIG. 5 illustrates a processing flow (user addition) in the key exchange method.
Figure 6:
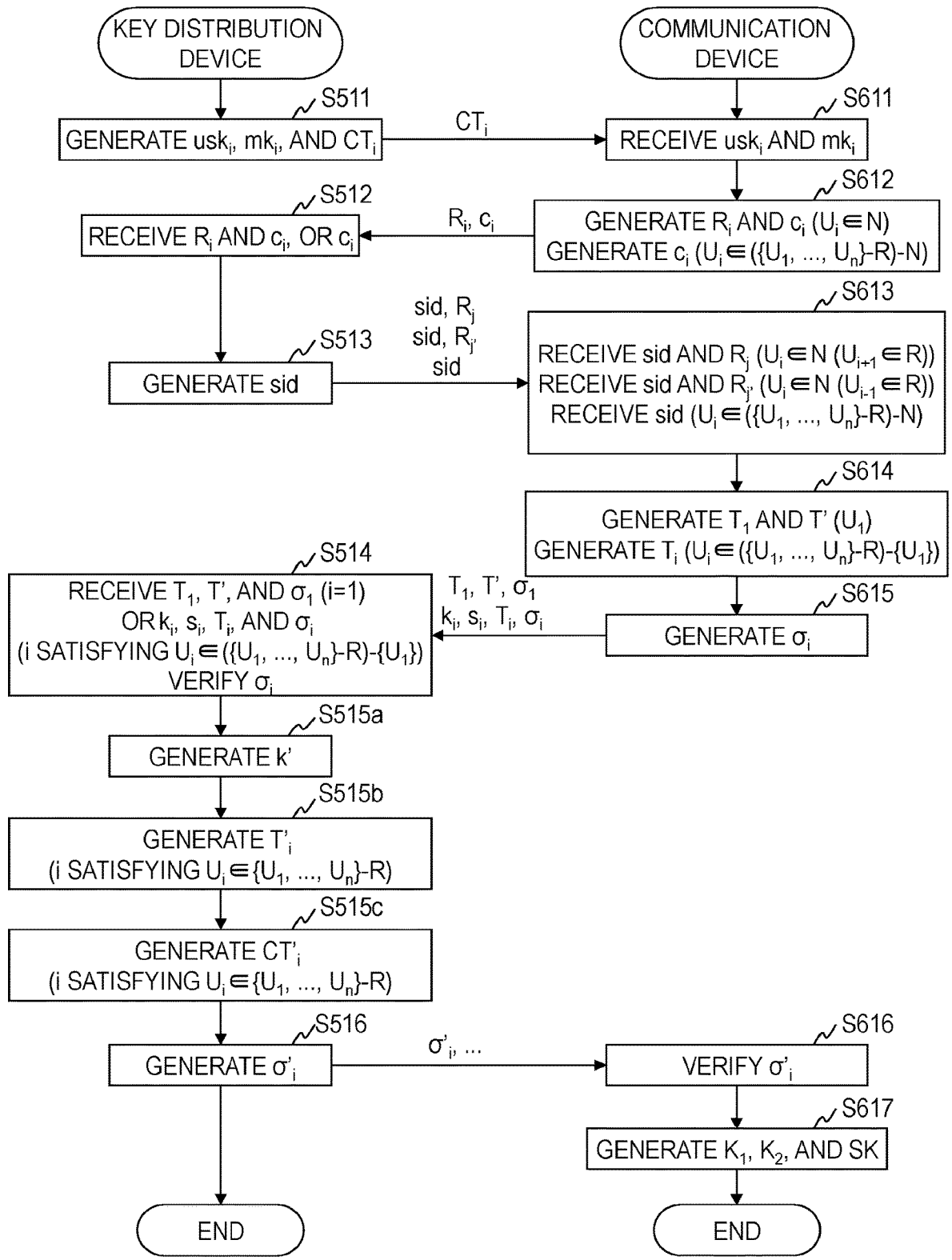
FIG. 6 illustrates a processing flow (user deletion) in the key exchange method.

A processing procedure of the key exchange method in user addition and user deletion will be described with reference to FIGS. 5 and 6. It is assumed that the session key SK has been already shared among the communication devices U$_i$(i∈1, . . . , n). Each of the communication devices U$_i$ stores secret information to be used for user addition and user deletion in the storage 200 after the end of the key exchange processing (after S217).

The representative communication device U$_i$ stores secret information H$_1^l$, H$_1^r$, and r computed by the following formulas in the storage 200.

$$H_1^l = R_n^{r_1}$$

$$H_1^r = R_2^{r_1}$$

$$r = F'''(sid, K_1) \oplus F'''(sid, K_2)$$

Here, F''': $\{0, 1\}^\kappa \times FS_\kappa \to Z_p$ is a pseudo-random function.

The general communication devices U$_i$(i∈{2, . . . , n}) store secret information H$_i^l$, H$_i^r$, and r computed by the following formulas in the storage 200.

$$H_i^l = R_{i-1}^{r_i}$$

$$H_i^r = R_{i+1}^{r_i}$$

$$r = F'''(sid, K_1) \oplus F'''(sid, K_2)$$

<User Addition>

A processing procedure of user addition in the key exchange method according to the embodiment will be described with reference to FIG. 5.

It is assumed that communication devices U$_{n+1}$, . . . , U$_{n+k}$ (k is an integer which is 1 or larger and n+k is an integer which is N or smaller) newly join a session established by the communication devices U$_1$, . . . , U$_n$. Hereinafter, it is assumed that i∈{1, . . . , n+k} holds.

In step S311, in the case where a session is started by the communication device U$_i$ (i=1, . . . , n+k) and the session is the first session in a time frame TF' of the communication devices U$_i$, the user key transmission unit 111 of the key distribution device S generates a user secret key usk$_i$←Der (Params, msk, A$_i$) of the communication device U$_i$ based on the key derivation algorithm Der for functional encryption, with current time and attribution respectively used as time and A$_i$=(U$_i$, time). Further, the user key transmission unit 111 generates a MAC key mk$_i$←MGen of the communication device U$_i$ based on the key generation algorithm MGen for a message authentication code. Then, the user key transmission unit 111 encrypts the user secret key usk$_i$ and the MAC key mk$_i$ by using the public key pk$_i$ of the communication devices U$_i$ based on the encryption algorithm Enc for public key encryption so as to generate the cipher text CT$_i$←Enc$_{pki}$(usk$_i$, mk$_i$). The user key transmission unit 111 transmits the cipher text CT$_i$ to each of the communication devices U$_i$.

Further, in the case where a time frame has been changed from the session established by the communication devices U$_1$, . . . , U$_n$, that is, in the case where TF' and TF are not equal to each other, the key distribution device S generates ~K$_1$∈$_R$$\{0, 1\}^\kappa$ and ~K'$_1$∈$_R$FS$_\kappa$ and computes K$_1$=tPRF'(~K$_1$, ~K'$_1$, st$_S$, st'$_S$) based on the twisted pseudo-random function tPRF'. Here, the computation of K$_1$ is performed by the third key generation unit 115 of the key distribution device S in step S315a which will be described later, so that the computation does not have to be performed here.

In step S411, the user key reception unit 211 of the communication devices U$_i$ (i=1, . . . , n+k) decrypts the cipher text CT$_i$, which is received from the key distribution device S, by using the secret key sk$_i$ of the communication devices U$_i$ based on the decryption algorithm Dec for public key encryption so as to obtain a user secret key and a MAC key (usk$_i$, mk$_i$)←Dec$_{ski}$(CT$_i$). The user key reception unit 211 stores the user secret key usk$_i$ and the MAC key mk$_i$ in the storage 200.

In step S412, in the case of i∈{1}∪[n, n+k], the first key generation unit 212 of the communication device U$_i$ generates ~r$_i$∈$_R$$\{0, 1\}^\kappa$, ~r'$_i$∈$_R$FS$_\kappa$, ~k$_i$∈$_R$$\{0, 1\}^\kappa$, ~k'$_i$∈$_R$FS$_\kappa$, ~s$_i$∈$_R$$\{0, 1\}^\kappa$, and ~s'$_i$∈$_R$FS$_\kappa$ so as to compute r$_i$=tPRF(~r$_i$, ~r'$_i$, st$_i$, st'$_i$), k$_i$=tPRF(~k$_i$, ~k'$_i$, st$_i$, st'$_i$), and s$_i$=tPRF(~s$_i$, ~s'$_i$, st$_i$, st'$_i$) based on the twisted pseudo-random function tPRF. Further, the first key generation unit 212 computes R$_i$=g$^{r_i}$ and c$_i$=g$^{k_i}$h$^{s_i}$. Then, the first key generation unit 212 transmits (R$_i$, c$_i$) to the key distribution device S.

In the case of i∈[2, n−1], the first key generation unit 212 of the communication devices U$_i$ generates ~k$_i$∈$_R$$\{0, 1\}^\kappa$, ~k'$_i$∈$_R$FS$_\kappa$, ~s$_i$∈$_R$$\{0, 1\}^\kappa$, and ~s'$_i$∈$_R$FS$_\kappa$ and computes k$_i$=tPRF(~k$_i$, ~k'$_i$, st$_i$, st'$_i$) and s$_i$=tPRF(~s$_i$, ~s'$_i$, st$_i$, st'$_i$) based on the twisted pseudo-random function tPRF. Further, the first key generation unit 212 computes c$_i$=g$^{k_i}$h$^{s_i}$. Then, the first key generation unit 212 transmits c$_i$ to the key distribution device S.

In step S312, the key distribution device S receives (R$_i$, c$_i$) or c$_i$ from the communication devices U$_i$. At this time, the key distribution device S stands by until the key distribution device S receives (R$_i$, c$_i$), c$_2$, . . . , c$_{n−1}$, (R$_n$, c$_n$), . . . , (R$_{n+k}$, c$_{n+k}$) respectively from all of the communication devices U$_1$, . . . , U$_{n+k}$.

In step S313, the session ID generation unit 113 of the key distribution device S generates sid=H(c$_1$, . . . c$_{n+k}$) by using c$_1$, . . . , c$_{n+k}$, which are received from the communication devices U$_1$, . . . , U$_{n+k}$, based on the target-collision resistant hash function H. Further, one piece of communication device is selected as a representative from k+2 pieces of communication devices $U_1$, $U_n$, $U_{n+1}$, ..., $U_{n+k}$. It is assumed that the communication device $U_1$ is selected, and $U_1$ is called a representative communication device in this example. Further, n+k−1 pieces of communication devices $U_i$ (i∈{2, ..., n+k}) other than the representative communication device $U_1$ are called general communication devices. In the case of i∈[n+1, n+k], the session ID generation unit 113 transmits (sid, $R_{i-1}$, $R_{i+1}$) to each of the communication devices $U_i$ (here, $R_{n+k+1}=R_1$). Further, in the case of i∈[1, 2], the session ID generation unit 113 transmits (sid, $R_{i-1}$) to each of the communication devices $U_i$ (here, $R_0=R_{n+K}$). In the case of i∈[3, n−2], the session ID generation unit 113 transmits sid to each of the communication devices $U_i$. In the case of i∈[n−1, n], the session ID generation unit 113 transmits (sid, $R_{i+1}$) to each of the communication devices $U_i$. Further, the key distribution device S notifies $U_1$ that $U_1$ is the representative.

In step S413, each of the communication devices $U_i$ receives any of (sid, $R_{i-1}$, $R_{i+1}$), (sid, $R_{i-1}$), sid, and (sid, $R_{i+1}$) from the key distribution device S. The communication devices $U_i$ execute the following processing (specifically, step S414 and step S415) as soon as the communication devices $U_i$ receive any of (sid, $R_{i-1}$, $R_{i+1}$), (sid, $R_{i-1}$), sid, and (sid, $R_{i+1}$). This processing is executed for six cases which are the case of i=1, the case of i=2, the case of i∈[3, n−2], the case of i=n−1, the case of i=n, and the case of i∈[n+1, n+k]. However, in the case of i∈[3, n−2], no processing is performed in step S414. That is, as soon as the communication devices $U_i$ receive sid, the communication devices $U_i$ execute the processing of step S415.

In the case of i=1, in step S414, the second key generation unit 214 of the representative communication device $U_1$ generates $K_1^l$ by using (sid, $R_{n+k}^{r1}$) based on the pseudo-random function F and generates $K_1^r$ by using (sid, $g^{r1r}$) based on the pseudo-random function F so as to compute $T_1$ by an exclusive OR of $K_1^l$ and $K_1^r$ and compute T' by the exclusive OR of $K_1^l$ and $k_1\|s_1$, as the following formulas. Here, $\|$ denotes a concatenation operator.

$$K_1^l = F(sid, R_{n+k}^{r1}),$$

$$K_1^r = F(sid, g^{r1r}),$$

$$T_1 = K_1^l \oplus K_1^r,$$

$$T' = K_1^l \oplus (k_1 \| s_1)$$

In step S415, the authentication tag generation unit 215 of the representative communication device $U_1$ generates an authentication tag $\sigma_1 = \text{Tag}_{mk1}(R_1, c_1, R_{n+k}, T_1, T', U_1, \text{sid})$ by using the MAC key $mk_1$ based on the tag generation algorithm Tag for a message authentication code. The authentication tag generation unit 215 transmits ($T_1$, T', $\sigma_1$) to the key distribution device S.

In the case of i=2, in step S414, the second key generation unit 214 of the communication device $U_2$ generates $K_2^l$ by using (sid, $R_1^r$) based on the pseudo-random function F and generates $K_2^r$ by using (sid, $g^r$) based on the pseudo-random function F so as to compute $T_2$ by an exclusive OR of $K_2^l$ and $K_2^r$, as the following formulas.

$$K_2^l = F(sid, R_1^r),$$

$$K_2^r = F(sid, g^r),$$

$$T_2 = K_2^l \oplus K_2^r$$

In step S415, the authentication tag generation unit 215 of the communication device $U_2$ generates an authentication tag $\sigma_2 = \text{Tag}_{mk2}(c_2, R_1, k_2, s_2, T_2, U_2, \text{sid})$ by using the MAC key $mk_i$ based on the tag generation algorithm Tag for a message authentication code. The authentication tag generation unit 215 transmits ($k_2$, $s_2$, $T_2$, $\sigma_2$) to the key distribution device S.

In the case of i∈[3, n−2], in step S415, the authentication tag generation unit 215 of the communication devices $U_i$ generates an authentication tag $\sigma_i = \text{Tag}_{mki}(c_i, k_i, s_i, U_i, \text{sid})$ by using the MAC key $mk_i$ based on the tag generation algorithm Tag for a message authentication code. The authentication tag generation unit 215 transmits ($k_i$, $s_i$, $\sigma_i$) to the key distribution device S.

In the case of i=n−1, in step S414, the second key generation unit 214 of the communication device $U_{n-1}$ generates $K_{n-1}^l$ by using (sid, $g^r$) based on the pseudo-random function F and generates $K_{n-1}^r$ by using (sid, $R_n^r$) based on the pseudo-random function F so as to compute $T_{n-1}$ by an exclusive OR of $K_{n-1}^l$ and $K_{n-1}^r$, as the following formulas.

$$K_{n-1}^l = F(sid, g^r),$$

$$K_{n-1}^r = F(sid, R_n^r),$$

$$T_{n-1} = K_n^l \oplus K_{n-1}^r$$

In step S415, the authentication tag generation unit 215 of the communication device $U_{n-1}$ generates an authentication tag $\sigma_{n-1} = \text{Tag}_{mkn-1}(c_{n-1}, R_n, k_{n-1}, s_{n-1}, T_{n-1}, U_{n-1}, \text{sid})$ by using the MAC key $mk_{n-1}$ based on the tag generation algorithm Tag for a message authentication code. The authentication tag generation unit 215 transmits ($k_{n-1}$, $s_{n-1}$, $T_{n-1}$, $\sigma_{n-1}$) to the key distribution device S.

In the case of i=n, in step S414, the second key generation unit 214 of the communication device $U_n$ generates $K_n^l$ by using (sid, $R_n^r$) based on the pseudo-random function F and generates $K_n^r$ by using (sid, $R_{n+1}^{rn}$) based on the pseudo-random function F so as to compute $T_n$ by an exclusive OR of $K_n^l$ and $K_n^r$, as the following formulas.

$$K_n^l = F(sid, R_n^r),$$

$$K_n^r = F(sid, R_{n+1}^{rn}),$$

$$T_n = K_n^l \oplus K_n^r$$

In step S415, the authentication tag generation unit 215 of the communication device $U_n$ generates an authentication tag $\sigma_n = \text{Tag}_{mkn}(R_n, C_n, R_{n+1}, k_n, s_n, T_n, U_n, \text{sid})$ by using the MAC key $mk_n$ based on the tag generation algorithm Tag for a message authentication code. The authentication tag generation unit 215 transmits ($k_n$, $s_n$, $T_n$, $\sigma_n$) to the key distribution device S.

In the case of i∈[n+1, n+k], in step S414, the second key generation unit 214 of the communication device $U_i$ generates $K_i^l$ by using (sid, $R_{i-1}^{ri}$) based on the pseudo-random function F and generates $K_i^r$ by using (sid, $R_{i+1}^{ri}$) based on the pseudo-random function F so as to compute $T_i$ by an exclusive OR of $K_i^l$ and $K_i^r$, as the following formulas.

$$k_i^l = F(sid, R_{i-1}^{ri}),$$

$$K_i^r = F(sid, R_{i+1}^{ri}),$$

$$T_i = K_i^l \oplus K_i^r$$

In step S415, the authentication tag generation unit 215 of the communication devices $U_i$ generates an authentication tag $\sigma_i = \text{Tag}_{mki}(R_i, c_i, R_{i-1}, R_{i+1}, k_i, s_i, T_i, U_i, \text{sid})$ by using the MAC key $mk_i$ based on the tag generation algorithm Tag for a message authentication code. The authentication tag generation unit 215 transmits $(k_i, s_i, T_i, \sigma_i)$ to the key distribution device S.

In step S314, the authentication tag verification unit 114 of the key distribution device S receives $(T_1, T', \sigma_1)$ from the representative communication devices $U_i$, receives $(k_i, s_i, T_i, \sigma_i)$ from the general communication devices $U_i$ with respect to $i=2, n-1, \ldots, n+k$, and receives $(k_i, s_i, \sigma_i)$ from the general communication device $U_i$ with respect to $i=3, \ldots, n-2$ so as to perform verification based on the verification algorithm Ver for a message authentication code. When the authentication tag $a_i$ $(i=1, \ldots, n+k)$ is invalid, the authentication tag verification unit 114 ends the session of the communication devices $U_i$. Further, the authentication tag verification unit 114 verifies whether or not $c_i = g^{ki} h^{si}$ is satisfied with respect to $i=2, \ldots, n+k$. When $c_i = g^{ki} h^{si}$ is not satisfied, the authentication tag verification unit 114 ends the session of the general communication devices $U_i$.

In step S315a, the third key generation unit 115 of the key distribution device S generates $\sim k_S \in_R \{0,1\}^\kappa$ and $\sim k'_S \in_R FS_\kappa$ so as to compute $k_S = tPRF(\sim k_S, \sim k'_S, st_S, st_S)$ based on the twisted pseudo-random function tPRF. Further, the third key generation unit 115 computes k' by the following formula.

$$k' = (\oplus_{2 \le i \le n+k} k_i) \oplus k_S$$

In step S315b, the third key generation unit 115 of the key distribution device S computes $T'_i$ with respect to $i=2, \ldots, n+k$ by the following formula.

$$T'_i = \oplus_{1 \le j \le i-1} T_j$$

Here, $T_i$ is nil with respect to $i=3, \ldots, n-1$. Accordingly, $T_3' = \ldots = T_{n-1}'$ is obtained.

In step S315c, the third key generation unit 115 of the key distribution device S encrypts a common key $K_1$ with respect to $i=1, \ldots, n+k$ based on the encryption algorithm FEnc for functional encryption with the access structure $P_i = (ID=U_i)^\wedge(time \in TF)$ so as to generate a cipher text $CT'_i = FEnc(Params, P_i, K_1)$. Here, ID is a predicate variable representing a communication device and TF is a predicate variable representing a time frame of the communication device.

In step S316, the key distribution device S generates an authentication tag and transmits the authentication tag to the communication devices $U_i$. This processing is executed for six cases which are the case of $i=1$, the case of $i=2$, the case of $i \in [3, n-2]$, the case of $i=n-1$, the case of $i=n$, and the case of $i \in [n+1, n+k]$.

In the case of $i=1$, the authentication tag generation unit 116 of the key distribution device S generates an authentication tag $\sigma'_1 = Tag_{mk1}(R_1, c_1, R_{n+k}, T_1, T', U_1, sid, k', CT'_1)$ by using the MAC key $mk_1$ of the representative communication device $U_1$ based on the tag generation algorithm Tag for a message authentication code. The authentication tag generation unit 116 transmits $(k', CT'_1, \sigma'_1)$ to the representative communication device $U_1$.

In the case of $i=2$, the authentication tag generation unit 116 of the key distribution device S generates an authentication tag $\sigma'_2 = Tag_{mk2}(c_2, R_1, k_2, s_2, T_2, U_2, sid, c_1, k', T'_2, T', CT'_2)$ by using the MAC key $mk_i$ of the general communication device $U_2$ based on the tag generation algorithm Tag for a message authentication code. The authentication tag generation unit 116 transmits $(c_1, k', T'_2, T', CT'_2, \sigma'_2)$ to the general communication device $U_2$.

In the case of $i \in [3, n-2]$, the authentication tag generation unit 116 of the key distribution device S generates an authentication tag $\sigma'_i = Tag_{mki}(c_i, k_i, s_i, U_i, sid, c_1, k', T'_i, T', CT'_i)$ by using the MAC key $mk_i$ of the general communication devices $U_i$ based on the tag generation algorithm Tag for a message authentication code. The authentication tag generation unit 116 transmits $(c_1, k', T'_i, T', CT'_S, \sigma'_i)$ to the general communication device $U_i$.

In the case of $i=n-1$, the authentication tag generation unit 116 of the key distribution device S generates an authentication tag $\sigma'_{n-1} = Tag_{mkn-1}(c_{n-1}, R_n, k_{n-1}, s_{n-1}, T_{n-1}, U_{n-1}, sid, c_1, k', T'_{n-1}, T', CT'_{n-1})$ by using the MAC key $mk_{n-1}$ of the general communication device $U_{n-1}$ based on the tag generation algorithm Tag for a message authentication code. The authentication tag generation unit 116 transmits $(c_1, k', T'_{n-1}, T', CT'_{n-1}, \sigma'_{n-1})$ to the general communication device $U_{n-1}$.

In the case of $i=n$, the authentication tag generation unit 116 of the key distribution device S generates an authentication tag $\sigma'_n = Tag_{mkn}(R_n, c_n, R_{n+1}, k_n, s_n, T_n, U_n, sid, c_1, k', T'_n, T', CT'_n)$ by using the MAC key $mk_n$ of the general communication devices $U_n$ based on the tag generation algorithm Tag for a message authentication code. The authentication tag generation unit 116 transmits $(c_1, k', T'_n, T', CT'_n, \sigma'_n)$ to the general communication device $U_n$.

In the case of $i \in [n+1, n+k]$, the authentication tag generation unit 116 of the key distribution device S generates an authentication tag $\sigma'_i = Tag_{mki}(R_i, c_i, R_{i-1}, R_{i+1}, k_i, s_i, T_i, U_i, sid, c_1, k', T'_i, T', CT'_i)$ by using the MAC key $mk_i$ of the general communication devices $U_i$ based on the tag generation algorithm Tag for a message authentication code. The authentication tag generation unit 116 transmits $(c_1, k', T'_i, T', CT'_i, \sigma'_i)$ to the general communication devices $U_i$.

In step S416, in the case of $i \cup [2, n+k]$, the authentication tag verification unit 216 of the general communication devices $U_i$ receives $(c_1, k', T'_i, T', CT'_i, \sigma'_i)$ from the key distribution device S and performs verification based on the verification algorithm Ver for a message authentication code. When the authentication tag $\sigma'_i$ is invalid, the authentication tag verification unit 216 ends the session of the general communication devices $U_i$. Further, the authentication tag verification unit 216 computes $K_1^l$ by an exclusive OR of $T'_i$ and $K_i^l$ with respect to $i=2, n, \ldots, n+k$ and computes $K_1^l$ by an exclusive OR of $T'_i$ and $g^r$ with respect to $i=3, \ldots, n-1$.

$$K_1^l = T'_i \oplus K_i^l$$

$$K_1^l = T'_i \oplus g^r$$

Further, the authentication tag verification unit 216 computes $k_1 \| s_1$ by an exclusive OR of T' and $K_1^l$.

$$k_1 \| s_1 = T' \oplus K_1^l$$

Then, the authentication tag verification unit 216 verifies whether or not $c_i = g^{k1} h^{s1}$ is satisfied. When $c_i = g^{k1} h^{s1}$ is not satisfied, the authentication tag verification unit 216 ends the session of the general communication devices $U_i$.

In the case of $i=1$, the authentication tag verification unit 216 of the representative communication device $U_1$ receives $(k', CT'_1, \sigma'_1)$ from the key distribution device S and performs verification based on the verification algorithm Ver for a message authentication code. When the authentication tag $\sigma'_1$ is invalid, the authentication tag verification unit 216 ends the session of the representative communication device $U_1$.

In step S417, the session key generation unit 217 of the communication devices $U_i$ $(i=1, \ldots, n+k)$ decrypts the common key $K_1 \leftarrow FDec_{uski}(CT'_i, P_i)$ by using the user secret key $usk_i$ of the communication devices $U_i$ based on the decryption algorithm FDec for functional encryption. Further, the session key generation unit 217 computes a common key $K_2$ based on the pseudo-random function F' as the following formula.

$$K_2 = F'(sid, k' \oplus k_1)$$

Then, the session key generation unit 217 computes a session key SK based on the pseudo-random function F''' as the following formula.

$$SK = F''(sid, K_1) \oplus F'''(sid, K_2)$$

Last, the communication devices $U_i$ (i=1, ..., n) update secret information to be used for user addition and user deletion. Further, the communication devices $U_i$ (i=n+1, ..., n+k) newly store the secret information in the storage 200.

The representative communication devices $U_1$ update the secret information stored in the storage 200 with secret information $H_1^l$ and r computed by the following formulas.

$$H_1^l = R_{n+k}^{r1}$$

$$r = F'''(sid, K_1) \oplus F'''(sid, K_2)$$

The communication device $U_i$ (i=2, ..., n−1) updates the secret information stored in the storage 200 with secret information r computed by the following formula.

$$r = F'''(sid, K_1) \oplus F'''(sid, K_2)$$

The communication devices $U_n$ update the secret information stored in the storage 200 with secret information $H_n^r$ and r computed by the following formulas.

$$H_n^r = R_{n+1}^{rn}$$

$$r = F'''(sid, K_1) \oplus F'''(sid, K_2)$$

The communication device $U_i$ (i=n+1, ..., n+k) stores secret information $H_i^l$, $H_i^r$, and r computed by the following formulas in the storage 200.

$$H_i^l = R_{i-1}^{ri}$$

$$H_i^r = R_{i+1}^{ri}$$

$$r = F'''(sid, K_1) \oplus F'''(sid, K_2)$$

According to the key exchange technology of the present invention, the above-described configuration makes it unnecessary to preliminarily register information of users who perform key exchange as the related art, thus enabling efficient share of common key at the time of user addition as well. Specifically, the whole computational complexity required for the key exchange is the constant number of times which is the number of users, that is, O(1).

Here, the processing for guaranteeing integrity by using the message authentication code algorithm, that is, the processing for generation and verification of an authentication tag in S415, S314, S316, and S416 may be omitted.

Further, the communication devices $U_i$ are configured to generate two keys, that is, the common key $K_2$ and the session key SK from sid based on the pseudo-random function so as to share these two keys among the communication devices $U_i$. However, the communication devices $U_i$ may be configured to generate and share only the common key $K_2$.

<User Deletion>

A processing procedure of user deletion in the key exchange method according to the embodiment will be described with reference to FIG. 6.

It is assumed that communication devices $U_{j1}$, ..., $U_{jm}$ leave from a session established by the communication devices $U_1$, ..., $U_n$ (here, m is an integer which is 1 or larger). Hereinafter, it is assumed that $R=\{U_{j1}, \ldots, U_{jm}\}$ holds. Further, it is assumed that $N=\{U_{j1-1}, U_{j1+1}, \ldots, U_{jm-1}, U_{jm+1}\}$ holds. Accordingly, both of R and N are subsets of $\{U_1, \ldots, U_n\}$.

Here, even in a case of $U_1 \in N$, generality is not lost. Therefore, $U_1 \in N$ is assumed.

In step S511, in the case where a session is started by the communication devices $U_i$ ($\in \{U_1, \ldots, U_n\}$−R) and the session is the first session in a time frame TF' of the communication devices U the user key transmission unit 111 of the key distribution device S generates a user secret key $usk_i \leftarrow \text{Der}(\text{Params}, \text{msk}, A_i)$ of the communication devices $U_i$ based on the key derivation algorithm Der for functional encryption, with current time and attribution respectively used as time and $A_i = (U_i, \text{time})$. Further, the user key transmission unit 111 generates a MAC key $mk_i \leftarrow \text{MGen}$ of the communication devices $U_i$ based on the key generation algorithm MGen for a message authentication code. Then, the user key transmission unit 111 encrypts the user secret key $usk_i$ and the MAC key $mk_i$ by using the public key $pk_i$ of the communication device $U_i$ based on the encryption algorithm Enc for public key encryption so as to generate the cipher text $CT_i \leftarrow \text{Enc}_{pki}(usk_i, mk_i)$. The user key transmission unit 111 transmits the cipher text $CT_i$ to each of the communication devices $U_i$.

Further, in the case where a time frame has been changed from the session established by the communication device $U_1, \ldots, U_n$, that is, in the case where TF' and TF are not equal to each other, the key distribution device S generates $\sim K_1 \in_R \{0, 1\}^\kappa$ and $\sim K'_1 \in_R FS_\kappa$ so as to compute $K_1 = \text{tPRF}'(\sim K_1, \sim K'_1, st_S, st'_S)$ based on the twisted pseudo-random function tPRF'. Here, the computation of $K_1$ is performed by the third key generation unit 115 of the key distribution device S in step S515a which will be described later, so that the computation does not have to be performed here.

In step S611, the user key reception unit 211 of the communication devices $U_i$ ($\in \{U_1, \ldots, U_n\}$−R) decrypts the cipher text $CT_i$, which is received from the key distribution device S, by using the secret key $sk_i$ of the communication devices $U_i$ based on the decryption algorithm Dec for public key encryption so as to obtain a user secret key and a MAC key $(usk_i, mk_i) \leftarrow \text{Dec}_{ski}(CT_i)$. The user key reception unit 211 stores the user secret key $usk_i$ and the MAC key $mk_i$ in the storage 200.

In step S612, in the case of $U_i \in N$, the first key generation unit 212 of the communication devices $U_i$ generates $\sim r_i \in_R \{0, 1\}^\kappa$, $\sim r'_i \in_R FS_\kappa$, $\sim k_i \in_R \{0, 1\}^\kappa$, $\sim k'_i \in_R FS_\kappa$, $\sim s_i \in_R \{0, 1\}^\kappa$, and $\sim s'_i \in_R FS_\kappa$ and computes $r_i = \text{tPRF}(\sim r_i, \sim r'_i, st_i, st'_i)$, $k_i = \text{tPRF}(\sim k_i, \sim k'_i, st_i, st'_i)$, and $s_i = \text{tPRF}(\sim s_i, \sim s'_i, st_i, st'_i)$ based on the twisted pseudo-random function tPRF. Further, the first key generation unit 212 computes $R_i = g^{ri}$ and $c_i = g^{ki} h^{si}$. Then, the first key generation unit 212 transmits $(R_i, c_i)$ to the key distribution device S.

In the case of $U_i \in (\{U_1, \ldots, U_n\}-R)-N$, the first key generation unit 212 of the communication devices $U_i$ generates $\sim k_i \in_R \{0, 1\}^\kappa$, $\sim k'_i \in_R FS_\kappa$, $\sim s_i \in_R \{0, 1\}^\kappa$, and $\sim s'_i \in_R FS_\kappa$ and computes $k_i = \text{tPRF}(\sim k_i, \sim k'_i, st_i, st'_i)$ and $s_i = \text{tPRF}(\sim s_i, \sim s'_i, st_i, st'_i)$ based on the twisted pseudo-random function tPRF. Further, the first key generation unit 212 computes $c_i = g^{ki} h^{si}$. Then, the first key generation unit 212 transmits $c_i$ to the key distribution device S.

In step S512, the key distribution device S receives $(R_i, c_i)$ from the communication devices $U_i \in N$ and receives $c_i$ from the communication devices $U_i \in (\{U_i, U_n\}-R)-N$. At this time, the key distribution device S stands by until the key distribution device S receives $(R_i, c_i)$ or $c_i$ from all of the communication devices $U_i$.

In step S513, the session ID generation unit 113 of the key distribution device S generates sid=H({$c_i$}) by using {$c_i$}, which are received from the communication devices $U_i \in \{U_1, \ldots, U_n\}-R$, based on the target-collision resistant hash function H. Further, one piece of communication device is selected as a representative from the communication devices $U_i \in N$. It is assumed that the communication device $U_1$ is selected, and $U_1$ is called a representative communication device in this example. Further, n−1−m pieces of communication devices $U_i \in \{U_2, \ldots, U_n\}-R$ other than the representative communication device $U_1$ are called general communication devices. With respect to i which satisfies $U_i \in N$ and $U_{i+1} \in R$, the session ID generation unit 113 transmits (sid, $R_j$) to each of the communication devices $U_i$ (here, j is a minimum index which satisfies $U_j \in N$ and j>i). Further, with respect to i which satisfies $U_i \in N$ and $U_{i-1} \in R$, the session ID generation unit 113 transmits (sid, $R_{j'}$) to each of the communication devices $U_i$ (here, j' is a maximum index which satisfies $U_{j'} \in N$ and j'<i). With respect to i which satisfies $U_i \in (\{U_1, \ldots, U_n\}-R)-N$, the session ID generation unit 113 transmits sid to each of the communication devices $U_i$. Further, the key distribution device S notifies $U_1$ that $U_1$ is the representative.

In step S613, each of the communication devices $U_i$ receives any of (sid, $R_j$), (sid, $R_{j'}$), and sid from the key distribution device S. The communication devices $U_i$ execute the following processing (specifically, step S614 and step S615) as soon as the communication devices $U_i$ receive any of (sid, $R_j$), (sid, $R_{j'}$), and sid. This processing is executed for four cases which are the case of i=1, the case of i which satisfies $U_i \in N$ and $U_{i+1} \in R$ (i is not 1), the case of i which satisfies $U_i \in N$ and $U_{i-1} \in R$ (i is not 1), and the case of i which satisfies $U_i \in (\{U_1, \ldots, U_n\}-R)-N$ (i is not 1). Further, in the case of i=1, this processing is executed for three cases.

In the case of i=1, in step S614, any of a couple of $U_j=U_3$ and $U_{j'}=U_{n-1}$, a couple of $U_{j'}=U_{n-1}$ and $U_2 \in N$, and a couple of $U_j=U_3$ and $U_n \in N$ is satisfied. When the couple of $U_j=U_3$ and $U_{j'}=U_{n-1}$ is satisfied, the second key generation unit 214 of the representative communication device $U_1$ generates $K_1^l$ by using (sid, $R_{n-1}^{r1}$) based on the pseudo-random function F and generates $K_1^r$ by using (sid, $R_3^{r1}$) based on the pseudo-random function F so as to compute $T_1$ by the exclusive OR of $K_1^l$ and $K_1^r$ and compute T' by the exclusive OR of $K_1^l$ and $k_1 \| s_1$, as the following formulas. Here, $\|$ denotes a concatenation operator.

$$K_1^l = F(sid, R_{n-1}^{r1}),$$

$$K_1^r = F(sid, R_3^{r1}),$$

$$T_1 = K_1^l \oplus K_1^r,$$

$$T' = K_1^l \oplus (k_1 \| s_1)$$

When the couple of $U_{j'}=U_{n-1}$ and $U_2 \in N$ is satisfied, the second key generation unit 214 of the representative communication device $U_1$ generates $K_1^l$ by using (sid, $R_{n-1}^{r1}$) based on the pseudo-random function F and generates $K_1^r$ by using (sid, $H_1^r$) based on the pseudo-random function F so as to compute $T_1$ by the exclusive OR of $K_1^l$ and $K_1^r$ and compute T' by the exclusive OR of $K_1^l$ and $k_1 \| s_1$, as the following formulas. Here, $\|$ denotes a concatenation operator.

$$K_1^l = F(sid, R_{n-1}^{r1}),$$

$$K_1^r = F(sid, H_1^r),$$

$$T_1 = K_1^l \oplus K_1^r,$$

$$T' = K_1^l \oplus (k_1 \| s_1)$$

When the couple of $U_j=U_3$ and $U_n \in N$ is satisfied, the second key generation unit 214 of the representative communication device $U_1$ generates $K_1^l$ by using (sid, $H_1^l$) based on the pseudo-random function F and generates $K_1^r$ by using (sid, $R_3^{r1}$) based on the pseudo-random function F so as to compute $T_1$ by the exclusive OR of $K_1^l$ and $K_1^r$ and compute T' by the exclusive OR of $K_1^l$ and $k_1 \| s_1$, as the following formulas. Here, $\|$ denotes a concatenation operator.

$$K_1^l = F(sid, H_1^l),$$

$$K_1^r = F(sid, R_3^{r1}),$$

$$T_1 = K_1^l \oplus K_1^r,$$

$$T' = K_1^l (k_1 \| s_1)$$

In step S615, the authentication tag generation unit 215 of the representative communication device $U_1$ generates an authentication tag $\sigma_1 = \text{Tag}_{mk1}(R_1, c_1, (R_3, R_{n-1}), T_1, T', U_1, sid)$ by using the MAC key $mk_1$ based on the tag generation algorithm Tag for a message authentication code. The authentication tag generation unit 215 transmits ($T_1, T', \sigma_1$) to the key distribution device S.

With respect to i which satisfies the couple of $U_i \in N$ and $U_{i+1} \in R$ (i is not 1), in step S614, the second key generation unit 214 of the communication devices $U_i$ generates $K_i^l$ by using (sid, $H_i^l$) based on the pseudo-random function F and generates $K_i^r$ by using (sid, $R_j^{ri}$) based on the pseudo-random function F so as to compute $T_i$ by the exclusive OR of $K_i^l$ and $K_i^r$, as the following formulas.

$$K_i^l = F(sid, H_i^l),$$

$$K_i^r = F(sid, R_j^{ri}),$$

$$T_i = K_i^l \oplus K_i^r$$

In step S615, the authentication tag generation unit 215 of the communication devices $U_i$ generates an authentication tag $\sigma_i = \text{Tag}_{mki}(R_i, c_i, R_j, k_i, s_i, T_i, U_i, sid)$ by using the MAC key $mk_i$ based on the tag generation algorithm Tag for a message authentication code. The authentication tag generation unit 215 transmits ($k_i, s_i, T_i, \sigma_i$) to the key distribution device S.

With respect to i which satisfies the couple of $U_i \in N$ and $U_{i-1} \in R$ (i is not 1), in step S614, the second key generation unit 214 of the communication devices $U_i$ generates $K_i^l$ by using (sid, $R_{j'}^{ri}$) based on the pseudo-random function F and generates $K_i^r$ by using (sid, $H_i^r$) based on the pseudo-random function F so as to compute $T_i$ by the exclusive OR of $K_i^l$ and $K_i^r$, as the following formulas.

$$K_i^l = F(sid, R_{j'}^{ri}),$$

$$K_i^r = F(sid, H_i^r),$$

$$T_i = K_i^l \oplus K_i^r$$

In step S615, the authentication tag generation unit 215 of the communication devices $U_i$ generates an authentication tag $\sigma_i = \text{Tag}_{mki}(R_i, c_i, R_{j'}, k_i, s_i, T_i, U_i, sid)$ by using the MAC key $mk_i$ based on the tag generation algorithm Tag for a message authentication code. The authentication tag generation unit 215 transmits ($k_i, s_i, T_i, \sigma_i$) to the key distribution device S.

With respect to i which satisfies $U_i \in (\{U_1, \ldots, U_n\}-R)-N$ (i is not 1), in step S614, the second key generation unit 214 of the communication device $U_i$ generates $K_i^l$ by using (sid, $H_i^l$) based on the pseudo-random function F and generates $K_i^r$ by using (sid, $H_i^r$) based on the pseudo-random function F so as to compute $T_i$ by the exclusive OR of $K_i^l$ and $K_i^r$, as the following formulas.

$$K_i^l = F(sid, H_i^l),$$

$$K_i^r = F(sid, H_i^r),$$

$$T_i = K_i^l \oplus K_i^r$$

In step S615, the authentication tag generation unit 215 of the communication devices $U_i$ generates an authentication tag $\sigma_i = \text{Tag}_{mki}(c_i, k_i, s_i, T_i, U_i, sid)$ by using the MAC key $mk_i$ based on the tag generation algorithm Tag for a message authentication code. The authentication tag generation unit 215 transmits $(k_i, s_i, T_i, \sigma_i)$ to the key distribution device S.

In step S514, the authentication tag verification unit 114 of the key distribution device S receives $(T_1, T', \sigma_1)$ from the representative communication device $U_1$, and receives $(k_i, s_i, T_i, \sigma_i)$ from the general communication devices $U_i$ other than the representative communication device $U_1$, that is, from $U_i \in (\{U_1, \ldots, U_n\} - R) - \{U_1\}$ so as to perform verification based on the verification algorithm Ver for a message authentication code. When the authentication tag $\sigma_i$ is invalid, the authentication tag verification unit 114 ends the session of the communication devices $U_i$. The authentication tag verification unit 114 verifies whether or not $c_i = g^{ki} h^{si}$ is satisfied in the case of $U_i \in (\{U_1, \ldots, U_n\} - R) - \{U_1\}$. When $c_i = g^{ki} h^{si}$ is not satisfied, the authentication tag verification unit 114 ends the session of the general communication devices $U_i$.

In step S515a, the third key generation unit 115 of the key distribution device S generates $\sim k_S \in_R \{0, 1\}^\kappa$ and $\sim k'_S \in_R FS_\kappa$ so as to compute $k_S = \text{tPRF}(\sim k_S, \sim k'_S, st_S, st'_S)$ based on the twisted pseudo-random function tPRF. The third key generation unit 115 computes k' by the following formula with respect to i which satisfies $U_i \in (\{U_1, \ldots, U_n\} - R) - \{U_1\}$.

$$k' = (\oplus \{k_i\}) \oplus k_S$$

In step S515b, the third key generation unit 115 of the key distribution device S computes $T'_i$ by the following formula in the case of $U_i \in \{U_1, \ldots, U_n\} - R$.

$$T'_i = \oplus_{1 \leq j \leq i-1} T_j$$

Here, $T_j$ is nil with respect to j which satisfies $U_j \in R$.

In step S515c, the third key generation unit 115 of the key distribution device S encrypts the common key $K_1$ with respect to i which satisfies $U_i \in \{U_1, \ldots, U_n\} - R$ based on the encryption algorithm FEnc for functional encryption with the access structure $P_i = (ID = U_i) \wedge (time \in TF)$ so as to generate a cipher text $CT'_i = FEnc(Params, P_i, K_1)$. Here, ID is a predicate variable representing a communication device and TF is a predicate variable representing a time frame of the communication device.

In step S516, the key distribution device S generates an authentication tag and transmits the authentication tag to the communication devices Ui. This processing is executed for four cases which are the case of i=1, the case of i which satisfies $U_i \in N$ and $U_{i+1} \in R$, the case of i which satisfies $U_i \in N$ and $U_{i-1} \in R$, and the case of i which satisfies $U_i \in (\{U_1, \ldots, U_n\} - R) - N$.

In the case of i=1, the authentication tag generation unit 116 of the key distribution device S generates an authentication tag $\sigma'_1 = \text{Tag}_{mk1}(R_1, c_1, (R_3, R_{n-1}), T_1, T', U_1, sid, k', CT'_1)$ by using the MAC key $mk_1$ of the representative communication device $U_1$ based on the tag generation algorithm Tag for a message authentication code. The authentication tag generation unit 116 transmits $(k', CT'_1, \sigma'_1)$ to the representative communication device $U_1$.

In the case of i which satisfies $U_i \in N$ and $U_{i+1} \in R$, the authentication tag generation unit 116 of the key distribution device S generates an authentication tag $\sigma'_i = \text{Tag}_{mki}(R_i, c_i, R_j, k_i, s_i, T_i, U_i, sid, c_1, k', T'_1, CT'_i)$ by using the MAC key $mk_i$ of the general communication devices $U_i$ based on the tag generation algorithm Tag for a message authentication code. The authentication tag generation unit 116 transmits $(c_1, k', T'_i, T', CT'_i, \sigma'_i)$ to the general communication devices $U_i$.

In the case of i which satisfies $U_i \in N$ and $U_{i-1} \in R$, the authentication tag generation unit 116 of the key distribution device S generates an authentication tag $\sigma'_i = \text{Tag}_{mki}(R_i, c_i, R_j, k_i, s_i, T_i, U_i, sid, c_1, k', T'_i, T', CT'_i)$ by using the MAC key $mk_i$ of the general communication devices $U_i$ based on the tag generation algorithm Tag for a message authentication code. The authentication tag generation unit 116 transmits $(c_i, k', T'_i, T', CT'_i, \sigma'_i)$ to the general communication devices $U_i$.

In the case of i which satisfies $U_i \in (\{U_1, \ldots, U_n\} - R) - N$, the authentication tag generation unit 116 of the key distribution device S generates an authentication tag $\sigma'_i = \text{Tag}_{mki}(c_i, k_i, s_i, T_i, U_i, sid, c_1, k', T'_i, T', CT'_i)$ by using the MAC key $mk_i$ of the general communication devices $U_i$ based on the tag generation algorithm Tag for a message authentication code. The authentication tag generation unit 116 transmits $(c_1, k', T'_i, T', CT'_i, \sigma'_i)$ to the general communication device $U_i$.

In step S616, with respect to i which satisfies $U_i \in (\{U_1, \ldots, U_n\} - R) - \{U_1\}$, the authentication tag verification unit 216 of the general communication devices $U_i$ receives $(c_1, k', T'_i, T', CT'_i, \sigma'_i)$ from the key distribution device S and performs verification based on the verification algorithm Ver for a message authentication code. When the authentication tag $\sigma'_i$ is invalid, the authentication tag verification unit 216 ends the session of the general communication devices $U_i$. Further, the authentication tag verification unit 216 computes $K_1^l$ by the exclusive OR of $T'_i$ and $K_i^l$ and computes $k_1 \| s_1$ by the exclusive OR of T' and $K_1^l$, as the following formulas.

$$K_1^l = T_i' \oplus K_i^l$$

$$k_1 \| s_1 = T' \oplus K_1^l$$

Then, the authentication tag verification unit 216 verifies whether or not $c_1 = g^{k1} h^{s1}$ is satisfied. When $c_1 = g^{k1} h^{s1}$ is not satisfied, the authentication tag verification unit 216 ends the session of the general communication devices $U_i$.

In the case of i=1, the authentication tag verification unit 216 of the representative communication device $U_1$ receives $(k', CT'_1, \sigma'_1)$ from the key distribution device S and performs verification based on the verification algorithm Ver for a message authentication code. When the authentication tag $\sigma'_1$ is invalid, the authentication tag verification unit 216 ends the session of the representative communication device $U_1$.

In step S617, the session key generation unit 217 of the communication devices $U_i$ ($\in \{U_1, \ldots, U_n\} - R$) decrypts the common key $K_1 \partial FIDec_{uski}(CT'_i, P_i)$ by using the user secret key $usk_i$ of the communication devices $U_i$ based on the decryption algorithm FDec for functional encryption. Further, the session key generation unit 217 computes the common key $K_2$ based on the pseudo-random function F' as the following formula.

$$K_2 = F'(sid, k' \oplus k_1)$$

Then, the session key generation unit 217 computes the session key SK based on the pseudo-random function F" as the following formula.

$$SK=F''(sid,K_1) \oplus F''(sid,K_2)$$

Last, the communication devices $U_i \in \{U_1, \ldots, U_n\}$–R update secret information to be used for user addition and user deletion.

The communication devices $U_i (\in \{U_1, \ldots, U_n\}$–R) update the secret information stored in the storage 200 with secret information r computed by the following formula.

$$r=F'''(sid,K_1) \oplus F'''(sid,K_2)$$

Further, the representative communication device $U_j$ updates the secret information stored in the storage 200 with secret information $H_1^r$ (the case of $U_2 \in R$) and $H_1^l$ (the case of $U_n \in R$) respectively computed by the following formulas.

$$H_1^r = R_j^{r1}$$

$$H_1^l = R_j^{r1}$$

With respect to i which satisfies $U_i \in N$ and $U_{i+1} \in R$, the communication devices $U_i$ update the secret information stored in the storage 200 with secret information $H_i^r$ computed by the following formula.

$$H_i^r = R_j^{ri}$$

With respect to i which satisfies $U_i \in N$ and $U_{i-1} \in R$, the communication devices $U_i$ update the secret information stored in the storage 200 with secret information $H_i^l$ computed by the following formula.

$$H_i^l = R_j^{ri}$$

According to the key exchange technology of the present invention, the above-described configuration makes it unnecessary to preliminarily register information of users who perform key exchange as the related art, thus enabling efficient share of common key at the time of user deletion as well. Specifically, the whole computational complexity required for the key exchange is the constant number of times which is the number of users, that is, O(1).

Here, the processing for guaranteeing integrity by using the message authentication code algorithm, that is, the processing for generation and verification of an authentication tag in S615, S514, S516, and S616 may be omitted.

Further, the communication devices $U_i$ are configured to generate two keys, that is, the common key $K_2$ and the session key SK from sid based on the pseudo-random function so as to share these two keys among the communication devices $U_i$. However, the communication devices $U_i$ may be configured to generate and share only the common key $K_2$.

It is obvious that the present invention is not limited to the above-described embodiment and alterations can be made as appropriate within a scope of the idea of the present invention. Various types of processing which are described in the above embodiment may be executed in time series in accordance with the described order and may be executed in parallel or individually in accordance with the processing capacity of the device performing the processing or in accordance with the need.

Furthermore, the above-described embodiment is presented for the purpose of exemplification and description. There is no encompassing intention and further, there is no intention to precisely limit the invention to the disclosed form. Modifications and variations can be made based on the above-described instruction. The embodiment is selected and presented so as to provide the best exemplification of the principle of the present invention and to enable those skilled in the art to use the present invention in various embodiments and use the present invention by adding various modifications for adaptation of the present invention to well-thought actual use. All of such modifications and variations are within the scope of the present invention defined by the added claims interpreted in accordance with the justly-, legally-, and fairly-granted latitude.

[Program and Recording Medium]

When various types of processing functions in the devices described in the above embodiment are implemented on a computer, the contents of processing function to be contained in each device is written by a program. With this program executed on the computer, various types of processing functions in the above-described devices are implemented on the computer.

This program in which the contents of processing are written can be recorded in a computer-readable recording medium. The computer-readable recording medium may be any medium such as a magnetic recording device, an optical disc, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit of the computer, for example. When the processing is performed, the computer reads out the program stored in the recording medium of the computer and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program according to the present embodiment includes information which is provided for processing performed by electronic calculation equipment and which is equivalent to a program (such as data which is not a direct instruction to the computer but has a property specifying the processing performed by the computer).

In the present embodiment, the present device is configured with a predetermined program executed on a computer. However, the present device may be configured with at least part of these processing contents realized in a hardware manner.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A key exchange method for a case where, in a key exchange system which includes a key distribution device S and n+k pieces (here, n is an integer which is 2 or larger and k is an integer which is 1 or larger) of communication devices $U_i$ (i=1, . . . , n+k), communication devices $U_{n+1}$, . . . , $U_{n+k}$ newly join a session established by communication devices $U_1$, $U_n$, in which
   ∥ is a concatenation operator,
   $_1$ is one piece of representative communication device which is selected from the communication devices $U_1$, $U_n$, $U_{n+1}$, . . . , $U_{n+k}$,
   a secret key $sk_S$ for public key encryption and secret strings $st_S$ and $st'_S$ of the key distribution device S are stored in a storage of the key distribution device S,
   a secret key $sk_i$ for public key encryption and secret strings $st_i$ and $st'_i$ of the communication devices $U_i$ are stored in a storage of the communication devices $U_i$ (i=1, . . . , n+k), and
   further, information r generated in the session established by the communication devices $U_1$, . . . , $U_n$ is stored in a storage of the communication devices $U_1$, . . . , $U_n$, the key exchange method comprising:
   a first key generation step in which the communication devices $U_i$ (i=1, n, . . . , n+k) generate values $r_i$, $k_i$, and $s_i$ by using the secret strings $st_i$ and $st'_i$ based on a twisted pseudo-random function, compute values $R_i=g^{r_i}$ and $c_i=g^{k_i}h^{s_i}$ (here, each of g and h denotes a generation source of a group G, which is a multiplication cyclic group of a prime number order p of κ bits), and transmit ($R_i$, $c_i$) to the key distribution device S, and the communication devices $U_i$ (i=2, . . . , n−1) generate values $k_i$ and $s_i$ by using the secret strings $st_i$ and $st'_i$ based on the twisted pseudo-random function, compute a value $c_i=g^{k_i}h^{s_i}$, and transmit the value $c_i$ to the key distribution device S;
   a session ID generation step in which the key distribution device S generates a value sid by using the values $c_1$, . . . , $c_{n+k}$ based on a target-collision resistant hash function and transmits, to the communication devices $U_i$, (sid, $R_{i-1}$) with respect to i=1, 2, the value sid with respect to i=3, . . . , n−2, (sid, $R_{i+1}$) with respect to i=n−1, n, and (sid, $R_{i-1}$, $R_{i+1}$) with respect to i= n+1, . . . , n+k (here, $R_0=R_{n+K}$ and $R_{n+k+1}=R_1$);
   a second key generation step in which the representative communication device $U_1$ generates a value $K_1^l$ by using (sid, $R_{n+k}^{r1}$) based on a pseudo-random function, generates a value $K_1^r$ by using (sid, $g^{r1 \cdot r}$) based on the pseudo-random function, computes a value $T_1$ by an exclusive OR of the values $K_1^l$ and $K_1^r$, computes a value T' by an exclusive OR of the value $K_1^l$ and $k_1\|s_1$, and transmits ($T_1$, T') to the key distribution device S, the communication device $U_2$ generates a value $K_2^l$ by using (sid, $R_1^r$) based on the pseudo-random function, generates a value $K_2^r$ by using (sid, $g^r$) based on the pseudo-random function, computes a value $T_2$ by an exclusive OR of the values $K_2^l$ and $K_2^r$, and transmits ($k_2$, $s_2$, $T_2$) to the key distribution device S, the communication devices U (i=3, . . . , n−2) transmit ($k_i$, $s_i$) to the key distribution device S, the communication device $U_{n-1}$ generates a value $K_{n-1}^l$ by using (sid, $g^r$) based on the pseudo-random function, generates a value $K_{n-1}^r$ by using (sid, $R_n^r$) based on the pseudo-random function, computes a value $T_{n-1}$ by an exclusive OR of the values $K_{n-1}^l$ and $K_{n-1}^r$, and transmits ($k_{n-1}$, $s_{n-1}$, $T_{n-1}$) to the key distribution device S, the communication device $U_n$ generates a value $K_n^l$ by using (sid, $R_n^r$) based on the pseudo-random function, generates a value $K_n^r$ by using (sid, $R_{n+1}^{rn}$) based on the pseudo-random function, computes a value $T_n$ by an exclusive OR of the values $K_n^l$ and $K_n^r$, and transmits ($k_n$, $s_n$, $T_n$) to the key distribution device S, and the communication devices $U_i$ (i=n+1, n+k) generate a value $K_i^l$ by using (sid, $R_{i-1}^{ri}$) based on the pseudo-random function, generate a value $K_i^r$ by using (sid, $R_{i+1}^{ri}$) based on the pseudo-random function, compute a value $T_i$ by an exclusive OR of the values $K_i^l$ and $K_i^r$, and transmit ($k_i$, $s_i$, $T_i$) to the key distribution device S;
   a third key generation step in which the key distribution device S generates a value $k_s$ by using the secret strings $st_S$ and $st'_S$ based on the twisted pseudo-random function, computes a value k' by an exclusive OR of the values $k_2$, . . . , $k_{n+k}$, $k_s$, computes a value $T'_i$ by an exclusive OR of the values $T_1$, . . . , $T_{i-1}$ with respect to i=2, . . . , n+k (here, $T_i$ is nil with respect to i=3, . . . , n−1), transmits the value k' to the representative communication device $U_1$, and transmits (k', $T'_i$, T') to the communication devices $U_i$ (i=2, . . . , n+k);
   a first session key generation step in which the communication devices $U_i$ (i=2, n, . . . , n+k) compute the value $K_1^l$ by an exclusive OR of the values $T'_i$ and $K_i^l$ and compute $k_1\|s_1$ by an exclusive OR of the values T' and $K_1^l$, and the communication devices $U_i$ (i=3, . . . , n−1) compute the value $K_1^l$ by an exclusive OR of the values $T'_i$ and $g^r$ and compute $k_1\|s_1$ by the exclusive OR of the values T' and $K_1^l$; and
   a second session key generation step in which the communication devices $U_i$ (i=1, . . . , n+k) generate a common key $K_2$ by using the value sid and an exclusive OR of the values k' and $k_1$ based on the pseudo-random function.

2. The key exchange method according to claim 1, in which
   time denotes current time, ID denotes a predicate variable representing the communication device, and TF denotes a predicate variable representing a time frame of the communication device, and
   a master secret key msk for functional encryption and a common key $K_1$ which is generated in a session established by the communication devices $U_1$, . . . , $U_n$ are further stored in the storage of the key distribution device S, the key exchange method further comprising:
   a user key transmission step in which the key distribution device S generates a user secret key $usk_i$ by using the master secret key msk with respect to i=1, . . . , n+k with attribution used as $A_i=(U_i$, time) based on a key derivation algorithm for functional encryption, and encrypts the user secret key $usk_i$ by using a public key $pk_i$ of the communication devices $U_i$ based on an encryption algorithm for public key encryption so as to generate a cipher text $CT_i$; and
   a user key reception step in which the communication devices $U_i$ (i=1, . . . , n+k) decrypt the cipher text $CT_i$ by using the secret key $sk_i$ based on a decryption algorithm for public key encryption so as to obtain the user secret key $usk_i$, wherein in the third key generation step, in a case where a time frame has been changed from the session established by the communication devices $U_1, \ldots, U_n$, the key distribution device S generates the common key $K_1$ by using the secret strings $st_S$ and $st'_S$ based on the twisted pseudo-random function, and in a case where a time frame has not been changed from the session established by the communication devices $U_1, \ldots, U_n$, the key distribution device S reads the common key $K_1$ stored in the storage and encrypts the common key $K_1$ with respect to $i=1, \ldots, n+k$ with an access structure $P_i=(ID=U_i) \wedge (time \in TF)$ based on an encryption algorithm for functional encryption so as to further generate a cipher text $CT'_i$, and in the second session key generation step, the communication devices $U_i$ ($i=1, \ldots, n+k$) decrypt the cipher text $CT'_i$ by using the user secret key $usk_i$ based on a decryption algorithm for functional encryption so as to obtain the common key $K_1$ and further compute a session key SK by an exclusive OR of a value generated by using (sid, $K_1$) based on the pseudo-random function and a value generated by using (sid, $K_2$) based on the pseudo-random function.

3. The key exchange method according to claim 2, in which in the user key transmission step, the key distribution device S further generates a MAC key $mk_i$ based on a key generation algorithm for a message authentication code and encrypts the user secret key $usk_i$ and the MAC key $mk_i$ by using the public key $pk_i$ of the communication devices $U_i$ based on the encryption algorithm for public key encryption so as to generate the cipher text $CT_i$, and in the user key reception step, the communication devices $U_i$ ($i=1, \ldots, n+k$) decrypt the cipher text $CT_i$ by using the secret key $sk_i$ based on the decryption algorithm for public key encryption so as to obtain the user secret key $usk_i$ and the MAC key $mk_i$, the key exchange method further comprising:

a first authentication tag generation step in which the representative communication device $U_1$ generates an authentication tag $\sigma_1$ by using the MAC key $mk_1$ and the values $R_1, c_1, R_{n+k}, T_1, T', U_1$, and sid based on a tag generation algorithm for a message authentication code, the communication device $U_2$ generates an authentication tag $\sigma_2$ by using the MAC key $mk_2$ and the values $c_2, R_1, k_2, s_2, T_2, U_2$, and sid based on the tag generation algorithm for a message authentication code, the communication devices $U_i$ ($i=3, \ldots, n-2$) generate an authentication tag $\sigma_i$ by using the MAC key $mk_i$ and the values $c_i, k_i, s_i, U_i$, and sid based on the tag generation algorithm for a message authentication code, the communication device $U_{n-1}$ generates an authentication tag $\sigma_{n-1}$ by using the MAC key $mk_{n-1}$ and the values $c_{n-1}, R_n, k_{n-1}, s_{n-1}, T_{n-1}, U_{n-1}$, and sid based on the tag generation algorithm for a message authentication code, the communication device $U_n$ generates an authentication tag $\sigma_n$ by using the MAC key $mk_n$ and the values $R_n, c_n, R_{n+1}, k_n, s_n, T_n, U_n$, and sid based on the tag generation algorithm for a message authentication code, and the communication devices $U_i$ ($i=n+1, \ldots, n+k$) generate an authentication tag $\sigma_i$ by using the MAC key $mk_i$ and the values $R_i, c_i, R_{i-1}, R_{i+1}, k_i, s_i, T_i, U_i$, and sid based on the tag generation algorithm for a message authentication code;

a first authentication tag verification step in which the key distribution device S receives $(T_1, T', \sigma_1)$ from the representative communication device $U_1$, receives $(k_i, s_i, T_i, \sigma_i)$ from the communication devices $U_i$ ($i=2, n-1, \ldots, n+k$), receives $(k_i, s_i, \sigma_i)$ from the communication devices $U_i$ ($i=3, \ldots, n-2$), verifies the authentication tag $\sigma_i$ by using the MAC key $mk_i$ ($i=1, \ldots, n+k$) based on a verification algorithm for a message authentication code, and verifies whether or not $c_i = g^{ki} h^{si}$ is satisfied with respect to $i=2, \ldots, n+k$;

a second authentication tag generation step in which the key distribution device S generates an authentication tag $\sigma'_1$ with respect to $i=1$ by using the MAC key $mk_1$ and the values $R_1, c_1, R_{n+k}, T_1, T', U_1$, sid, k', and $CT'_1$ based on the tag generation algorithm for a message authentication code, generates an authentication tag $\sigma'_2$ with respect to $i=2$ by using the MAC key $mk_2$ and the values $c_2, R_1, k_2, s_2, T_2, U_2$, sid, $c_1$, k', $T'_2$, T', and $CT'_2$ based on the tag generation algorithm for a message authentication code, generates an authentication tag with respect to $i=3, \ldots, n-2$ by using the MAC key $mk_i$ and the values $c_i, k_i, s_i, U_i$, sid, $c_1$, k', $T'_i$, T', and $CT'_i$ based on the tag generation algorithm for a message authentication code, generates an authentication tag $\sigma'_{n-1}$ with respect to $i=n-1$ by using the MAC key $mk_{n-1}$ and the values $c_{n-1}, R_n, k_{n-1}, s_{n-1}, T_{n-1}, U_{n-1}$, sid, $c_1$, k', $T'_{n-1}$, T', and $CT'_{n-1}$ based on the tag generation algorithm for a message authentication code, generates an authentication tag $\sigma'_n$ with respect to $i=n$ by using the MAC key $mk_n$ and the values $R_n, c_n, R_{n+1}, k_n, s_n, T_n, U_n$, sid, $c_1$, k', $T'_n$, T', and $CT'_n$ based on the tag generation algorithm for a message authentication code, and generates an authentication tag $\sigma'_i$ with respect to $i=n+1, \ldots, n+k$ by using the MAC key $mk_i$ and the values $R_i, c_i, R_{i-1}, R_{i+1}, k_i, s_i, T_i$, sid, $c_1$, k', $T'_i$, and $CT'_i$ based on the tag generation algorithm for a message authentication code; and a second authentication tag verification step in which the representative communication device $U_1$ receives (k', $CT'_1$, $\sigma'_1$) from the key distribution device S and verifies the authentication tag $\sigma'_1$ by using the MAC key $mk_1$ based on the verification algorithm for a message authentication code, and the communication devices $U_i$ ($i=2, \ldots, n+k$) receive ($c_1$, k', $T'_i$, T', $CT'_i$, $\sigma'_i$) from the key distribution device S, verify the authentication tag $\sigma'_i$, by using the MAC key $mk_i$ based on the verification algorithm for a message authentication code, and verify whether or not $c_i = g^{k1} h^{s1}$ is satisfied.

4. A key exchange system comprising:

a key distribution device S; and n+k pieces (here, n is an integer which is 2 or larger and k is an integer which is 1 or larger) of communication devices $U_i$ ($i=1, \ldots, n+k$), wherein

|| is a concatenation operator, $U_1$ is one piece of representative communication device which is selected from the communication devices $U_1, U_n, U_{n+1}, \ldots, U_{n+k}$, the key distribution device S includes a storage which stores a secret key $sk_S$ for public key encryption and secret strings $st_S$ and $st'_S$ of the key distribution device S, circuitry configured to:

execute a session ID generation processing which receives ($R_i, c_i$) from the communication devices $U_i$ ($i=1, \ldots n, n+k$), receives a value $c_i$ from the communication devices $U_i$ ($i=2, \ldots, n-1$), generates a value sid by using the values $c_1, \ldots, c_{n+k}$ based on a target-collision resistant hash function, and transmits, to the communication devices $U_i$, (sid, $R_{i-1}$) with respect to i=1, 2, the value sid with respect to i=3, ... n−2, (sid, $R_{i+1}$) with respect to i=n−1, n, and (sid, $R_{i-1}$, $R_{i+1}$) with respect to i=n+1, ..., n+k (here, $R_0 = R_{n+K}$, $R_{n+k+1} = R_1$), and execute a third key generation processing which receives ($T_1$, T') from the representative communication device $U_1$, receives ($k_i$, $s_i$, $T_i$) from the communication device $U_i$ (i=2, n−1, ..., n+k), receives ($k_i$, $s_i$) from the communication devices $U_i$ (i=3, ..., n−2), generates a value $k_s$ by using the secret strings $st_S$ and $st'_S$ based on a twisted pseudo-random function, computes a value k' by an exclusive OR of the values $k_2$, ..., $k_{n+k}$, $k_s$, computes a value $T'_i$ by an exclusive OR of the values $T_1$, ..., $T_{i-1}$ with respect to i=2, ..., n+k (here, $T_i$ is nil with respect to i=3, ..., n−1), transmits the value k' to the representative communication device $U_1$, and transmits (k', $T'_i$, T') to the communication devices $U_i$ (i=2, ..., n+k), and the communication devices $U_i$ (i=1, ..., n+k) include a storage which stores a secret key $sk_i$ for public key encryption and secret strings $st_i$ and $st'_i$ of the communication devices $U_i$ and further stores information r generated in a session established by the communication devices $U_1$, ..., $U_n$ with respect to i=1, ..., n, circuitry configured to:

execute a first key generation processing which generates values $r_i$, $k_i$, and $s_i$ by using the secret strings $st_i$ and $st'_i$ based on the twisted pseudo-random function, computes the values $R_i = g^{r_i}$ and $c_i = g^{k_i} h^{s_i}$ (here, each of g and h denotes a generation source of a group G, which is a multiplication cyclic group of a prime number order p of κ bits), and transmits ($R_i$, $c_i$) to the key distribution device S with respect to i=1, n, ..., n+k, and generates values $k_i$ and $s_i$ by using the secret strings $st_i$ and $st'_i$ based on the twisted pseudo-random function, computes the value $c_i = g^{k_i} h^{s_i}$, and transmits the value $c_i$ to the key distribution device S with respect to i=2, ..., n−1, execute a second key generation processing which receives (sid, $R_{n+k}$) from the key distribution device S, generates a value $K_1^l$ by using (sid, $R_{n+k}^{r_1}$) based on the pseudo-random function, generates a value $K_1^r$ by using (sid, $g^{r_1 r}$) based on the pseudo-random function, computes the value $T_1$ by an exclusive OR of the values $K_1^l$ and $K_1^r$, computes the value T' by an exclusive OR of the value $K_1^l$ and $k_1 \| s_1$, and transmits ($T_1$, T') to the key distribution device S with respect to i=1, receives (sid, $R_1$) from the key distribution device S, generates a value $K_2^l$ by using (sid, $R_1^r$) based on the pseudo-random function, generates a value $K_2^r$ by using (sid, $g^r$) based on the pseudo-random function, computes the value $T_2$ by an exclusive OR of the values $K_2^l$ and $K_2^r$, and transmits ($k_2$, $s_2$, $T_2$) to the key distribution device S with respect to i=2, receives the value sid from the key distribution device S and transmits ($k_i$, $s_i$) to the key distribution device S with respect to i=3, ..., n−2, receives (sid, $R_n$) from the key distribution device S, generates a value $K_{n-1}^l$ by using (sid, $g^r$) based on the pseudo-random function, generates a value $K_{n-1}^r$ by using (sid, $R_n^r$) based on the pseudo-random function, computes the value $T_{n-1}$ by an exclusive OR of the values $K_{n-1}^l$ and $K_{n-1}^r$, and transmits ($k_{n-1}$, $s_{n-1}$, $T_{n-1}$) to the key distribution device S with respect to i=n−1, receives (sid, $R_{n+1}$) from the key distribution device S, generates a value $K_n^l$ by using (sid, $R_n^r$) based on the pseudo-random function, generates a value $K_n^r$ by using (sid, $R_{n+1}^{r_n}$) based on the pseudo-random function, computes the value $T_n$ by an exclusive OR of the values $K_n^l$ and $K_n^r$, and transmits ($k_n$, $s_n$, $T_n$) to the key distribution device S with respect to i=n, and receives (sid, $R_{i-1}$, $R_{i+1}$) from the key distribution device S, generates a value $K_i^l$ by using (sid, $R_{i-1}^{r_i}$) based on the pseudo-random function, generates a value $K_i^r$ by using (sid, $R_{i+1}^{r_i}$) based on the pseudo-random function, computes the value $T_i$ by an exclusive OR of the values $K_i^l$ and $K_i^r$, and transmits ($k_i$, $s_i$, $T_i$) to the key distribution device S with respect to i=n+1, ..., n+k, and execute a session key generation processing which
  receives the value k' from the key distribution device S and generates a common key $K_2$ by using the value sid and an exclusive OR of the values k' and $k_1$ based on the pseudo-random function with respect to i=1,
  receives (k', $T'_i$, T') from the key distribution device S, computes the value $K_1^l$ by an exclusive OR of the values $T'_i$ and $K_i^l$, computes $k_1 \| s_1$ by an exclusive OR of the values T' and $K_1^l$, and generates the common key $K_2$ by using the value sid and the exclusive OR of the values k' and $k_1$ based on the pseudo-random function with respect to i=2, n, ..., n+k, and receives (k', $T'_i$, T') from the key distribution device S, computes the value $K_1^l$ by an exclusive OR of the values $T'_i$ and $g^r$, computes $k_1 \| s_1$ by an exclusive OR of the values T' and $K_1^l$, and generates the common key $K_2$ by using the value sid and the exclusive OR of the values k' and $k_1$ based on the pseudo-random function with respect to i=3, ..., n−1.

5. A key exchange method for a case where, in a key exchange system which includes a key distribution device S and n pieces (here, n is an integer which is 2 or larger) of communication devices $U_i$ (i=1, ..., n), communication devices $U_{j1}$, ..., $U_{jm}$ leave from a session established by communication devices $U_1$, ..., $U_n$, in which R={$U_{j1}$, ..., $U_{jm}$} is a subset of {$U_1$, ..., $U_n$} and N={$U_{j1-1}$, $U_{j1+1}$, ..., $U_{jm-1}$, $U_{jm+1}$} is a subset of {$U_1$, ..., $U_n$}, $\|$ is a concatenation operator, $U_1$ ($\in$N) is one piece of representative communication device which is selected from N, a secret key $sk_S$ for public key encryption and secret strings $st_S$ and $st'_S$ of the key distribution device S are stored in a storage of the key distribution device S, and a secret key $sk_i$ for public key encryption and secret strings $st_i$ and $st'_i$ of the communication devices $U_i$ and information $H_i^l$ and $H_i^r$ generated in the session established by the communication devices $U_1$, ..., $U_n$ are stored in a storage of the communication devices $U_i$ (i=1, ..., n), the key exchange method comprising:

a first key generation step in which the communication devices $U_i$ ($\in$N) generate values $r_i$, $k_i$, and $s_i$ by using the secret strings $st_i$ and $st'_i$ based on a twisted pseudo-random function, compute values $R_i = g^{r_i}$ and $c_i = g^{k_i} h^{s_i}$ (here, each of g and h denotes a generation source of a group G, which is a multiplication cyclic group of a prime number order p of κ bits), and transmit ($R_i$, $c_i$) to the key distribution device S, and the communication devices $U_i$ ($\in$({$U_1$, ..., $U_n$}−R)−N) generate values $k_i$ and $s_i$ by using the secret strings $st_i$ and $st'_i$ based on the twisted pseudo-random function, compute a value $c_i = g^{k_i} h^{s_i}$, and transmit the value $c_i$ to the key distribution device S;

a session ID generation step in which the key distribution device S generates a value sid by using {$c_i$|i satisfies $U_i \in \{U_1, \ldots, U_n\} - R\}$ based on a target-collision resistant hash function and transmits, to the communication devices $U_i$, (sid, $R_j$) with respect to i which satisfies $U_i \in N$ and $U_{i+1} \in R$ (here, j is a minimum index which satisfies $U_j \in N$ and j>i), (sid, $R_{j'}$) with respect to i which satisfies $U_i \in N$ and $U_{i-1} \in R$ (here, j' is a maximum index which satisfies $U_{j'} \in N$ and j'<i), and the value sid with respect to i which satisfies $U_i \in (\{U_1, \ldots, U_n\} - R) - N$;

a second key generations step in which the representative communication device $U_1$ generates a value $K_1^l$ by using (sid, $R_{n-1}^{r1}$) based on a pseudo-random function, generates a value $K_1^r$ by using (sid, $R_3^{r1}$) based on the pseudo-random function, computes a value $T_1$ by an exclusive OR of the values $K_1^l$ and $K_1^r$, computes a value T' by an exclusive OR of the value $K_1^l$ and $k_1\|s_1$, and transmits ($T_1$, T') to the key distribution device S in a case where $U_j = U_3$ and $U_{j'} = U_{n-1}$ are satisfied, generates a value $K_1^l$ by using (sid, $R_{n-1}^{r1}$) based on the pseudo-random function, generates a value $K_1^r$ by using (sid, $R_1^r$) based on the pseudo-random function, computes a value $T_1$ by the exclusive OR of the values $K_1^l$ and $K_1^r$, computes a value T' by the exclusive OR of the value $K_1^l$ and $k_1\|s_1$, and transmits ($T_1$, T') to the key distribution device S in a case where $U_{j'} = U_{n-1}$ and $U_2 \in N$ are satisfied, and generates a value $K_1^l$ by using (sid, $H_1^l$) based on the pseudo-random function, generates a value $K_1^r$ by using (sid, $R_3^{r1}$) based on the pseudo-random function, computes a value $T_1$ by the exclusive OR of the values $K_1^l$ and $K_1^r$, computes a value T' by the exclusive OR of the value $K_1^l$ and $k_1\|s_1$, and transmits ($T_1$, T') to the key distribution device S in a case where $U_j = U_3$ and $U_n \in N$ are satisfied, the communication devices $U_i$ (i satisfies $U_i \in N$ and $U_{i+1} \in R$ (here, i is not 1)) generate a value $K_i^l$ by using (sid, $H_i^l$) based on the pseudo-random function, generate a value $K_i^r$ by using (sid, $R_j^{ri}$) based on the pseudo-random function, compute a value $T_i$ by an exclusive OR of the values $K_i^l$ and $K_i^r$, and transmit ($k_i$, $s_i$, $T_i$) to the key distribution device S, the communication devices $U_i$ (i satisfies $U_i \in N$ and $U_{i-1} \in R$ (here, i is not 1)) generate a value by using (sid, $R_{j'}^{ri}$) based on the pseudo-random function, generate a value $K_i^r$ by using (sid, $H_i^r$) based on the pseudo-random function, compute a value $T_i$ by the exclusive OR of the values $K_i^l$ and $K_i^r$, and transmit ($k_i$, $s_i$, $T_i$) to the key distribution device S, and the communication devices $U_i$ (i satisfies $U_i \in (\{U_1, \ldots, U_n\} - R) - N$ (here, i is not 1)) generate a value $K_i^l$ by using (sid, $H_i^l$) based on the pseudo-random function, generate a value $K_i^r$ by using (sid, $H_i^r$) based on the pseudo-random function, compute a value $T_i$ by the exclusive OR of the values $K_i^l$ and $K_i^r$, and transmit ($k_i$, $s_i$, $T_i$) to the key distribution device S;

a third key generation step in which the key distribution device S generates a value $k_s$ by using the secret strings $st_S$ and $st'_S$ based on the twisted pseudo-random function, computes a value k' by an exclusive OR of $\{k_i | i$ satisfies $U_i \in (\{U_1, \ldots U_n\} - R) - \{U_1\}\}$ and the value $k_s$, computes a value $T'_i$ by an exclusive OR of the values $T_1, \ldots, T_j, \ldots, T_{i-1}$ with respect to i which satisfies $U_i \in \{U_1, \ldots, U_n\} - R$ (here, $T_j$ is nil with respect to j which satisfies $U_j \in R$), transmits the value k' to the representative communication device $U_1$, and transmits (k', $T'_i$, T') to the communication devices $U_i$ ($\in (\{U_1, \ldots, U_n\} - R) - \{U_1\}$);

a first session key generation step in which the communication devices $U_i$ ($\in (\{U_1, \ldots, U_n\} - R) - \{U_1\}$) compute the value $K_1^l$ by an exclusive OR of the values $T'_i$ and $K_i^l$ and compute $k_1 | s_1$ by an exclusive OR of the values T' and $K_1^l$; and a second session key generation step in which the communication devices $U_i$ ($\in \{U_1, \ldots, U_n\} - R$) generate the common key $K_2$ by using the value sid and the exclusive OR of the values k' and $k_1$ based on the pseudo-random function.

6. The key exchange method according to claim 5, in which time denotes current time, ID denotes a predicate variable representing the communication device, and TF denotes a predicate variable representing a time frame of the communication device, and a master secret key msk for functional encryption and a common key $K_1$ which is generated in a session established by the communication devices $U_1, \ldots, U_n$ are further stored in the storage of the key distribution device S, the key exchange method further comprising:

a user key transmission step in which the key distribution device S generates a user secret key $usk_i$ by using the master secret key msk with respect to i which satisfies $U_i \in \{U_1, \ldots, U_n\} - R$ with attribution used as $A_i = (U_i,$ time) based on a key derivation algorithm for functional encryption, and encrypts the user secret key $usk_i$ by using a public key $pk_i$ of the communication devices $U_i$ based on an encryption algorithm for public key encryption so as to generate a cipher text $CT_i$; and a user key reception step in which the communication devices $U_i \in \{U_1, \ldots, U_n\} - R$ decrypt the cipher text $CT_i$ by using the secret key $sk_i$ based on a decryption algorithm for public key encryption so as to obtain the user secret key $usk_i$, wherein in the third key generation step, in a case where a time frame has been changed from the session established by the communication devices $U_1, \ldots, U_n$, the key distribution device S generates the common key $K_1$ by using the secret strings $st_S$ and $st'_S$ based on the twisted pseudo-random function, and in a case where a time frame has not been changed from the session established by the communication devices $U_1, \ldots, U_n$, the key distribution device S reads the common key $K_1$ stored in the storage and encrypts the common key $K_1$ with respect to i which satisfies $U_i \in \{U_1, \ldots, U_n\} - R$ with an access structure $P_i = (ID = U_i) \wedge (time \in TF)$ based on an encryption algorithm for functional encryption so as to further generate a cipher text $CT'_i$, and in the second session key generation step, the communication devices $U_i$ ($\in \{U_1, \ldots, U_n\} - R$) decrypt the cipher text $CT'_i$ by using the user secret key $usk_i$ based on a decryption algorithm for functional encryption so as to obtain the common key $K_1$ and further compute a session key SK by an exclusive OR of a value generated by using (sid, $K_1$) based on the pseudo-random function and a value generated by using (sid, $K_2$) based on the pseudo-random function.

7. The key exchange method according to claim 6, in which in the user key transmission step, the key distribution device S further generates a MAC key $mk_i$ based on a key generation algorithm for a message authentication code and encrypts the user secret key $usk_i$ and the MAC key $mk_i$ by using the public key $pk_i$ of the communication devices $U_i$ based on the encryption algorithm for public key encryption so as to generate the cipher text $CT_i$, and in the user key reception step, the communication devices $U_i \in \{U_1, \ldots, U_n\}-R$ decrypt the cipher text $CT_i$ by using the secret key $sk_i$ based on the decryption algorithm for public key encryption so as to obtain the user secret key $usk_i$ and the MAC key $mk_i$, the key exchange method further comprising:

a first authentication tag generation step in which the representative communication device $U_1$ generates an authentication tag $\sigma_1$ by using the MAC key $mk_1$ and the values $R_1$, $c_1$, $(R_3, R_{n-1})$, $T_1$, $T'$, $U_1$, and sid based on the tag generation algorithm for a message authentication code, the communication devices $U_i$ (i satisfies $U_i \in N$ and $U_{i+1} \in R$) generate an authentication tag $\sigma_i$ by using the MAC key $mk_i$ and the values $R_i$, $c_i$, $R_j$, $k_i$, $s_i$, $T_i$, $U_i$, and sid based on the tag generation algorithm for a message authentication code, the communication devices $U_i$ (i satisfies $U_i \in N$ and $U_{i-1} \Sigma R$) generate an authentication tag $\sigma_i$ by using the MAC key $mk_i$ and the values $R_i$, $c_i$, $R_j$, $k_i$, $s_i$, $T_i$, $U_i$, and sid based on the tag generation algorithm for a message authentication code, and the communication devices $U_i$ (i satisfies $U_i \in (\{U_1, \ldots, U_n\}-R)-N$) generate an authentication tag $\sigma_i$ by using the MAC key mkd, and the values $c_i$, $k_i$, $s_i$, $T_i$, $U_i$ and sid based on the tag generation algorithm for a message authentication code;

a first authentication tag verification step in which the key distribution device S receives $(T_1, T', \sigma_1)$ from the representative communication device $U_1$, receives $(k_i, s_i, T_i, \sigma_i)$ from the communication devices $U_i$ ($\in (\{U_1, \ldots, U_n\}-R)-\{U_1\}$), verifies the authentication tag $\sigma_i$ by using the MAC key $mk_i$ (i satisfies $U_i \in \{U_1, \ldots, U_n\}-R$) based on a verification algorithm for a message authentication code, and verifies whether or not $c_i = g^{ki} h^{si}$ is satisfied with respect to i which satisfies $U_i \in (\{U_1, \ldots, U_n\}-R)-\{U_1\}$;

a second authentication tag generation step in which the key distribution device S generates an authentication tag $\sigma'_1$ with respect to i=1 by using the MAC key $mk_1$ and the values $R_1$, $c_1$, $(R_3, R_{n-1})$, $T_1$, $T'$, $U_1$, sid, k', and $CT'_1$ based on the tag generation algorithm for a message authentication code, generates an authentication tag $\sigma'_i$ with respect to i which satisfies $U_i \in N$ and $U_{i+1} \in R$ by using the MAC key $mk_i$ and the values $R_i$, $c_i$, $R_j$, $k_i$, $s_i$, $T_i$, $U_i$, sid, $c_1$, k', $T'_i$, T', and $CT'_i$ based on the tag generation algorithm for a message authentication code, generates an authentication tag $\sigma'_i$ with respect to i which satisfies $U_i \in N$ and $U_{i-1} \in R$ by using the MAC key $mk_i$ and the values $R_i$, $c_i$, $R_j$, $k_i$, $s_i$, $T_i$, $U_i$, sid, $c_1$, k', $T'_i$, T', and $CT'_i$ based on the tag generation algorithm for a message authentication code, and generates an authentication tag $\sigma'_{n-1}$ with respect to i which satisfies $U_i \in (\{U_1, \ldots, U_n\}-R)-N$ by using the MAC key $mk_{n-1}$ and the values $c_i$, $k_i$, $s_i$, $T_i$, $U_i$, sid, $c_1$, k', $T'_i$, T', and $CT'_i$ based on the tag generation algorithm for a message authentication code; and a second authentication tag verification step in which the representative communication device $U_1$ receives (k', $CT'_1$, $\sigma'_1$) from the key distribution device S and verifies the authentication tag $\sigma'_1$ by using the MAC key $mk_1$ based on the verification algorithm for a message authentication code, and the communication devices $U_i$ ($\in (\{U_1, \ldots, U_n\}-R)-\{U_1\}$) receive ($c_i$, k', $T'_i$, T', $CT'_i$, $\sigma'_i$) from the key distribution device S, verify the authentication tag $\sigma'_i$ by using the MAC key $mk_i$ based on the verification algorithm for a message authentication code, and verify whether or not $c_1 = g^{k1} h^{s1}$ is satisfied.

8. A key exchange system comprising:

a key distribution device S; and n pieces (here, n is an integer which is 2 or larger) of communication devices $U_i$ (i=1, \ldots, n), wherein $R = \{U_{j1}, \ldots, U_{jm}\}$ is a subset of $\{U_1, \ldots, U_n\}$ and $N = \{U_{j1-i}, U_{j1+1}, \ldots, U_{jm-1}, U_{jm1}\}$ is a subset of $\{U_1, \ldots, U_n\}$,

|| is a concatenation operator, $U_1$ ($\in N$) is one piece of representative communication device which is selected from N, the key distribution device S includes a storage which stores a secret key $sk_S$ for public key encryption and secret strings $st_S$ and $st'_S$ of the key distribution device S, circuitry configured to:

execute a session ID generation processing which receives $(R_i, c_i)$ from the communication devices $U_i$ ($\in N$), receives a value $c_i$ from the communication devices $U_i$ ($\in (\{U_1, \ldots, U_n\}-R)-N$), generates a value sid by using $\{c_i|i$ satisfies $U_i \in \{U_1, \ldots, U_n\}-R\}$ based on a target-collision resistant hash function, and transmits, to the communication devices $U_i$, (sid, $R_j$) with respect to i which satisfies $U_i \in N$ and $U_{i+1} \in R$ (here, j is a minimum index which satisfies $U_j \in N$ and j>i), (sid, $R_{j'}$) with respect to i which satisfies $U_i \in N$ and $U_{i-1} \in R$ (here, j' is a maximum index which satisfies $U_{j'} \in N$ and j'<i), and the value sid with respect to i which satisfies $U_i \in (\{U_1, \ldots, U_n\}-R)-N$, and execute a third key generation processing which receives $(T_1, T')$ from the representative communication device $U_1$, receives $(k_i, s_i, T_i)$ from the communication devices $U_i$ ($\in (\{U_1, \ldots, U_n\}-R)-\{U_1\}$), generates a value $k_s$ by using the secret strings $st_S$ and $st'_S$ based on the twisted pseudo-random function, computes a value k' by an exclusive OR of $\{k_i|i$ satisfies $U_i \in (\{U_1, \ldots, U_n\}-R)-\{U_1\}\}$ and the value $k_s$, computes a value $T'_i$ by an exclusive OR of the values $T_1, \ldots, T_j, T_{i-1}$ (here, $T_j$ is nil with respect to j which satisfies $U_j \in R$) with respect to i which satisfies $U_1 \in \{U_1, \ldots U_n\}-R$, transmits the value k' to the representative communication device $U_1$, and transmits (k', $T'_i$, T') to the communication devices $U_i$ ($\in (\{U_1, \ldots, U_n\}-R)-\{U_1\}$), and the communication devices $U_i$ ($\in \{U_1, \ldots U_n\}-R$) include a storage which stores a secret key $sk_i$ for public key encryption and secret strings $st_i$ and $st'_i$ of the communication devices $U_i$ and stores information $H_i^l$ and $H_i^r$ generated in a session established by the communication devices $U_1, \ldots, U_n$, circuitry configured to:

execute a first key generation processing which generates values $r_i$, $k_i$, and $s_i$ by using the secret strings $st_i$ and $st'_i$ based on a twisted pseudo-random function, computes the values $R_i = g^{ri}$ and $c_i = g^{ki} h^{si}$ (here, each of g and h denotes a generation source of a group G, which is a multiplication cyclic group of a prime number order p of $\kappa$ bits), and transmits $(R_i, c_i)$ to the key distribution device S with respect to i which satisfies $U_i \in N$, and generates values $k_i$ and $s_i$ by using the secret strings $st_i$ and $st'_i$ based on the twisted pseudo-random function, computes the value $c_i = g^{ki} h^{si}$, and transmits the value $c_i$ to the key distribution device S with respect to i which satisfies $U_i \in (\{U_1, \ldots, U_n\} - R) - N$,
execute a second key generation processing which, with respect to i=1, receives (sid, $R_3$, $R_{n-1}$) from the key distribution device S, generates a value $K_1^l$ by using (sid, $R_{n-1}^{r1}$) based on the pseudo-random function, generates a value $K_1^r$ by using (sid, $R_3^{r1}$) based on the pseudo-random function, computes the value $T_1$ by an exclusive OR of the values $K_1^l$ and $K_1^r$, computes the value T' by an exclusive OR of the value $K_1^l$ and $k_1 \| s_1$, and transmits ($T_1$, T') to the key distribution device S in a case where $U_j = U_3$ and $U_{j'} = U_{n-1}$ are satisfied, receives (sid, $R_{n-1}$) from the key distribution device S, generates a value $K_1^l$ by using (sid, $R_{n-1}^{r1}$) based on the pseudo-random function, generates a value $K_1^r$ by using (sid, $H_1^r$) based on the pseudo-random function, computes the value $T_1$ by the exclusive OR of the values $K_1^l$ and $K_1^r$, computes the value T' by the exclusive OR of the value $K_1^l$ and $k_1 \| s_1$, and transmits ($T_1$, T') to the key distribution device S in a case where $U_{j'} = U_{n-1}$ and $U_2 \in N$ are satisfied, and receives (sid, $R_3$) from the key distribution device S, generates a value $K_1^l$ by using (sid, $H_1^l$) based on the pseudo-random function, generates a value $K_1^r$ by using (sid, $R_3^{r1}$) based on the pseudo-random function, computes the value $T_1$ by the exclusive OR of the values $K_1^l$ and $K_1^r$, computes the value T' by the exclusive OR of the value $K_1^l$ and $k_1 \| s_1$, and transmits ($T_1$, T') to the key distribution device S in a case where $U_j = U_3$ and $U_n \in N$ are satisfied; with respect to i which satisfies $U_i \in N$ and $U_{i+1} \in R$ (i is not 1), receives (sid, $R_j$) from the key distribution device S, generates a value $K_i^l$ by using (sid, $H_i^l$) based on the pseudo-random function, generates a value $K_i^r$ by using (sid, $R_j^{ri}$) based on the pseudo-random function, computes the value $T_i$ by an exclusive OR of the values $K_i^l$ and $K_i^r$, and transmits ($k_i$, $s_i$, $T_i$) to the key distribution device S; with respect to i which satisfies $U_i \in N$ and $U_{i-1} \in R$ (i is not 1), receives (sid, $R_{j'}$) from the key distribution device S, generates a value $K_1^l$ by using (sid, $R_{j'}^{ri}$) based on the pseudo-random function, generates a value $K_i^r$ by using (sid, $H_i^r$) based on the pseudo-random function, computes the value $T_i$ by the exclusive OR of the values $K_i^l$ and $K_i^r$, and transmits ($k_i$, $s_i$, $T_i$) to the key distribution device S; and with respect to i which satisfies $U_i \in (\{U_1, \ldots, U_n\} - R) - N$ (i is not 1), receives the value sid from the key distribution device S, generates a value $K_i^l$ by using (sid, $H_i^l$) based on the pseudo-random function, generates a value $K_i^r$ by using (sid, $H_i^r$) based on the pseudo-random function, computes the value $T_i$ by the exclusive OR of the values $K_i^l$ and $K_i^r$, and transmits ($k_i$, $s_i$, $T_i$) to the key distribution device S, and
execute a session key generation processing which, with respect to i=1, receives the value k' from the key distribution device S and generates a common key $K_2$ by using the value sid and an exclusive OR of the values k' and $k_1$ based on the pseudo-random function, and with respect to i which satisfies $U_i \in (\{U_1, \ldots, U_n\} - R) - \{U_1\}$, receives (k', $T'_i$, T') from the key distribution device S, computes the value $K_1^l$ by an exclusive OR of the values $T'_i$ and $K_i^l$, computes $k_1 \| s_1$ by an exclusive OR of the values T' and $K_1^l$, and generates the common key $K_2$ by using the value sid and the exclusive OR of the values k' and $k_1$ based on the pseudo-random function.

9. A communication device which is included in a key exchange system comprising:
a key distribution device S; and
n+k pieces (here, n is an integer which is 2 or larger and k is an integer which is 1 or larger) of communication devices $U_i$ (i=1, ..., n+k), wherein
$\|$ is a concatenation operator,
$U_1$ is one piece of representative communication device which is selected from the communication devices $U_1$, $U_n$, $U_{n+1}$, ..., $U_{n+k}$,
the key distribution device S includes
a storage which stores a secret key $sk_S$ for public key encryption and secret strings $st_S$ and $st'_S$ of the key distribution device S,
circuitry configured to:
execute a session ID generation processing which receives ($R_i$, $c_i$) from the communication devices $U_i$ (i=1, n, ..., n+k), receives a value $c_i$ from the communication devices $U_i$ (i=2, ..., n−1), generates a value sid by using the values $c_1, \ldots, c_{n+k}$ based on a target-collision resistant hash function, and transmits, to the communication devices $U_i$, (sid, $R_{i-1}$) with respect to i=1, 2, the value sid with respect to i=3, ..., n−2, (sid, $R_{i+1}$) with respect to i=n−1, n, and (sid, $R_{i-1}$, $R_{i+1}$) with respect to i=n+1, ..., n+k (here, $R_0 = R_{n+K}$, $R_{n+k+1} = R_1$), and
execute a third key generation processing which receives ($T_1$, T') from the representative communication device $U_1$, receives ($k_i$, $s_i$, $T_i$) from the communication device $U_i$ (i=2, n−1, ..., n+k), receives ($k_i$, $s_i$) from the communication devices $U_i$ (i=3, ..., n−2), generates a value $k_s$ by using the secret strings $st_S$ and $st'_S$ based on a twisted pseudo-random function, computes a value k' by an exclusive OR of the values $k_2, \ldots, k_{n+k}, k_s$, computes a value $T'_i$ by an exclusive OR of the values $T_1, \ldots T_{i-1}$, with respect to i=2, ..., n+k (here, $T_i$ is nil with respect to i=3, ... n−1), transmits the value k' to the representative communication device $U_1$, and transmits (k', $T'_i$, T') to the communication devices $U_i$ (i=2, ..., n+k), and
the communication devices $U_i$ (i=1, ..., n+k) include
a storage which stores a secret key $sk_i$ for public key encryption and secret strings $st_i$ and $st'_i$ of the communication devices $U_i$ and further stores information r generated in a session established by the communication devices $U_1, \ldots, U_n$ with respect to i= 1, ..., n,
circuitry configured to:
execute a first key generation processing which generates values $r_i$, $k_i$, and $s_i$ by using the secret strings $st_i$ and $st'_i$ based on the twisted pseudo-random function, computes the values $R_i = g^{r_i}$ and $c_i = g^{k_i} h^{s_i}$ (here, each of g and h denotes a generation source of a group G, which is a multiplication cyclic group of a prime number order p of κ bits), and transmits ($R_i$, $c_i$) to the key distribution device S with respect to i=1, n, ..., n+k, and generates values $k_i$ and $s_i$ by using the secret strings $st_i$ and $st'_i$ based on the twisted pseudo-random function, computes the value $c_i = g^{k_i} h^{s_i}$, and transmits the value $c_i$ to the key distribution device S with respect to i=2, ..., n−1,
execute a second key generation processing which receives (sid $R_{n+k}$) from the key distribution device S, generates a value $K_1^l$ by using (sid, $R_{n+k}^{r1}$) based on the pseudo-random function, generates a value $K_1^r$ by using (sid, $g^{r1^r}$) based on the pseudo-random function, computes the value $T_1$ by an exclusive OR of the values $K_1^l$ and $K_1^r$, computes the value T' by an exclusive OR of the value $K_1^l$ and $k_1\|s_1$, and transmits ($T_1$, T') to the key distribution device S with respect to i=1, receives (sid, $R_1$) from the key distribution device S, generates a value $K_2^l$ by using (sid, $R_1^r$) based on the pseudo-random function, generates a value $K_2^r$ by using (sid, $g^r$) based on the pseudo-random function, computes the value $T_2$ by an exclusive OR of the values $K_2^l$ and $K_2^r$, and transmits ($k_2$, $s_2$, $T_2$) to the key distribution device S with respect to i=2, receives the value sid from the key distribution device S and transmits ($k_i$, $s_i$) to the key distribution device S with respect to i=3, ..., n−2, receives (sid, $R_n$) from the key distribution device S, generates a value $K_{n-1}^l$ by using (sid, $g^r$) based on the pseudo-random function, generates a value $K_{n-1}^r$ by using (sid, $R_n^r$) based on the pseudo-random function, computes the value $T_{n-1}$ by an exclusive OR of the values $K_{n-1}^l$ and $K_{n-1}^r$, and transmits ($k_{n-1}$, $s_{n-1}$, $T_{n-1}$) to the key distribution device S with respect to i=n−1, receives (sid, $R_{n+1}$) from the key distribution device S, generates a value $K_n^l$ by using (sid, $R_n^r$) based on the pseudo-random function, generates a value $K_n^r$ by using (sid, $R_{n+1}^{r1}$) based on the pseudo-random function, computes the value $T_n$ by an exclusive OR of the values $K_n^l$ and $K_n^r$, and transmits ($k_n$, $s_n$, $T_n$) to the key distribution device S with respect to i=n, and receives (sid, $R_{i-1}$, $R_{i+1}$) from the key distribution device S, generates a value $K_i^l$ by using (sid, $R_{i-1}^{r1}$) based on the pseudo-random function, generates a value $K_i^r$ by using (sid, $R_{i+1}^{r1}$) based on the pseudo-random function, computes the value $T_i$ by an exclusive OR of the values $K_i^l$ and $K_i^r$, and transmits ($k_i$, $s_i$, $T_i$) to the key distribution device S with respect to i=n+1, ..., n+k, and execute a session key generation processing which receives the value k' from the key distribution device S and generates a common key $K_2$ by using the value sid and an exclusive OR of the values k' and $k_1$ based on the pseudo-random function with respect to i=1, receives (k', $T'_i$, T') from the key distribution device S, computes the value $K_1^l$ by an exclusive OR of the values $T'_i$ and $K_i^l$, computes $k_1\|s_1$ by an exclusive OR of the values T' and $K_1^l$, and generates the common key $K_2$ by using the value sid and the exclusive OR of the values k' and $k_1$ based on the pseudo-random function with respect to i=2, n, ..., n+k, and receives (k', $T'_i$, T') from the key distribution device S, computes the value $K_1^l$ by an exclusive OR of the values T' and $g^r$, computes $k_1\|s_1$ by an exclusive OR of the values T' and $K_1^l$, and generates the common key $K_2$ by using the value sid and the exclusive OR of the values k' and $k_1$ based on the pseudo-random function with respect to i= 3, ..., n−1.

10. A communication device which is included in a key exchange system comprising:
  a key distribution device S; and
  n pieces (here, n is an integer which is 2 or larger) of communication devices $U_i$ (i=1, ..., n), wherein
  R={$U_{j1}$, ..., $U_{jm}$} is a subset of {$U_1$, ..., $U_n$} and N={$U_{j1-1}$, $U_{j1+1}$, ..., $U_{jm-1}$, $U_{jm1}$} is a subset of {$U_1$, ..., $U_n$},
  ∥ is a concatenation operator,
  $U_1$ (∈N) is one piece of representative communication device which is selected from N, the key distribution device S includes
  a storage which stores a secret key $sk_S$ for public key encryption and secret strings $st_S$ and $st'_S$ of the key distribution device S,
  circuitry configured to:
  execute a session ID generation processing which receives ($R_i$, $c_i$) from the communication devices $U_i$ (∈N), receives a value $c_i$ from the communication devices $U_i$ (∈({$U_1$, ..., $U_n$}−R−N), generates a value sid by using {$c_i$|i satisfies $U_i$∈{$U_1$, ..., $U_n$}−R} based on a target-collision resistant hash function, and transmits, to the communication devices $U_i$, (sid, $R_j$) with respect to i which satisfies $U_i$∈N and $U_{i+1}$∈R (here, j is a minimum index which satisfies $U_j$∈N and j>i), (sid, $R_{j'}$) with respect to i which satisfies $U_i$∈N and $U_{i-1}$∈R (here, j' is a maximum index which satisfies $U_{j'}$∈N and j'<i), and the value sid with respect to i which satisfies $U_i$∈ ({$U_1$, ..., $U_n$}−R)−N, and
  execute a third key generation processing which receives ($T_1$, T') from the representative communication device $U_1$, receives ($k_i$, $s_i$, $T_i$) from the communication devices $U_i$ (∈({$U_1$, ..., $U_n$}−R)−{$U_1$}), generates a value $k_s$ by using the secret strings $st_S$ and $st'_S$ based on the twisted pseudo-random function, computes a value k' by an exclusive OR of {$k_i$|i satisfies $U_i$∈({$U_1$, ... $U_n$}−R)−{$U_1$}} and the value $k_s$, computes a value $T'_i$ by an exclusive OR of the values $T_1$, ..., $T_j$, ..., $T_{i-1}$ (here, $T_j$ is nil with respect to j which satisfies $U_j$∈R) with respect to i which satisfies $U_i$∈{$U_1$, ..., $U_n$}−R, transmits the value k' to the representative communication device $U_1$, and transmits (k', $T'_i$, T') to the communication devices $U_i$ (∈({$U_1$, ..., $U_n$}−R)−{$U_1$}), and
  the communication devices $U_i$ (∈({$U_1$, ..., $U_n$}−R) include
  a storage which stores a secret key $sk_i$ for public key encryption and secret strings $st_i$ and $st'_i$ of the communication devices $U_i$ and stores information $H_i^l$ and $H_i^r$ generated in a session established by the communication devices $U_1$, ..., $U_n$,
  circuitry configured to:
  execute a first key generation processing which generates values $r_i$, $k_i$ and $s_i$ by using the secret strings $st_i$ and $st'_i$ based on a twisted pseudo-random function, computes the values $R_i=g^{ri}$ and $c_i=g^{ki}h^{si}$ (here, each of g and h denotes a generation source of a group G, which is a multiplication cyclic group of a prime number order p of κ bits), and transmits ($R_i$, $c_i$) to the key distribution device S with respect to i which satisfies $U_i$∈N, and generates values $k_i$ and $s_i$ by using the secret strings $st_i$ and $st'_i$ based on the twisted pseudo-random function, computes the value $c_i=g^{ki}h^{si}$, and transmits the value $c_i$ to the key distribution device S with respect to i which satisfies $U_i$∈({$U_1$, ..., $U_n$}−R)−N,
  execute a second key generation processing which, with respect to i=1, receives (sid, $R_3$, $R_{n-1}$) from the key distribution device S, generates a value $K_1^l$ by using (sid, $R_{n-1}^{r1}$) based on the pseudo-random function, generates a value $K_1^r$ by using (sid, $R_3^{r1}$) based on the pseudo-random function, computes the value $T_1$ by an exclusive OR of the values $K_1^l$ and $K_1^r$, computes the value T' by an exclusive OR of the value $K_1^l$ and $k_1\|s_1$, and transmits ($T_1$, T') to the key distribution device S in a case where $U_j=U_3$ and $U_j=U_{n-1}$ are satisfied, receives (sid, $R_{n-1}$) from the key distribution device S, generates a value $K_1^l$ by using (sid, $R_{n-1}^{r1}$) based on the pseudo-random function, generates a value $K_1^r$ by using (sid, $H_1^r$) based on the pseudo-random function, computes the value $T_1$ by the exclusive OR of the values $K_1^l$ and $K_1^r$, computes the value T' by the exclusive OR of the value $K_1^l$ and $k_1 \| s_1$, and transmits ($T_1$, T') to the key distribution device S in a case where $U_j=U_{n-1}$ and $U_2 \in N$ are satisfied, and receives (sid, $R_3$) from the key distribution device S, generates a value $K_1^l$ by using (sid, $H_1^l$) based on the pseudo-random function, generates a value $K_1^r$ by using (sid, $R_3^{r1}$) based on the pseudo-random function, computes the value $T_1$ by the exclusive OR of the values $K_1^l$ and $K_1^r$, computes the value T' by the exclusive OR of the value $K_1^l$ and $k_1 \| s_1$, and transmits ($T_1$, T') to the key distribution device S in a case where $U_j=U_3$ and $U_n \in N$ are satisfied; with respect to i which satisfies $U_i \in N$ and $U_{i+1} \in R$ (i is not 1), receives (sid, $R_j$) from the key distribution device S, generates a value by using (sid, $H_i^l$) based on the pseudo-random function, generates a value $K_i^l$ by using (sid, $R_3^{r1}$) based on the pseudo-random function, computes the value $T_i$ by an exclusive OR of the values $K_i^l$ and $K_i^r$, and transmits ($k_i$, $s_i$, $T_i$) to the key distribution device S; with respect to i which satisfies $U_i \in N$ and $U_{i-1} \in R$ (i is not 1), receives (sid, $R_{j'}$) from the key distribution device S, generates a value $K_i^l$ by using (sid, $R_{j'}^{ri}$) based on the pseudo-random function, generates a value $K_i^r$ by using (sid, $H_i^r$) based on the pseudo-random function, computes the value $T_i$ by the exclusive OR of the values $K_i^l$ and $K_i^r$, and transmits ($k_i$, $s_i$, $T_i$) to the key distribution device S; and with respect to i which satisfies $U_i \in (\{U_1, \ldots, U_n\} - R - N$ (i is not 1), receives the value sid from the key distribution device S, generates a value $K_i^l$ by using (sid, $H_i^l$) based on the pseudo-random function, generates a value $K_i^r$ by using (sid, $H_i^r$) based on the pseudo-random function, computes the value $T_i$ by the exclusive OR of the values $K_i^l$ and $K_i^r$, and transmits ($k_i$, $s_i$, $T_i$) to the key distribution device S, and execute a session key generation processing which, with respect to i=1, receives the value k' from the key distribution device S and generates a common key $K_2$ by using the value sid and an exclusive OR of the values k' and $k_1$ based on the pseudo-random function, and with respect to i which satisfies $U_i \in (\{U_1, \ldots, U_n\} - R) - \{U_1\}$, receives (k', T'$_i$, T') from the key distribution device S, computes the value $K_1^l$ by an exclusive OR of the values T'$_i$ and $K_i^l$, computes $k_1 \| s_1$ by an exclusive OR of the values T' and $K_1^l$, and generates the common key $K_2$ by using the value sid and the exclusive OR of the values k' and $k_1$ based on the pseudo-random function.

11. A non-transitory computer-readable storage medium which stores a program for causing a computer to operate as a communication device which is included in key exchange system comprising:

a key distribution device S; and n+k pieces (here, n is an integer which is 2 or larger and k is an integer which is 1 or larger) of communication devices $U_i$ (i=1, . . . , n+k), wherein $\|$ is a concatenation operator, $U_1$ is one piece of representative communication device which is selected from the communication devices $U_1$, $U_n$, $U_{n+1}$, . . . , $U_{n+k}$, the key distribution device S includes a storage which stores a secret key $sk_S$ for public key encryption and secret strings $st_S$ and $st'_S$ of the key distribution device S, circuitry configured to:

execute a session ID generation processing which receives ($R_i$, $c_i$) from the communication devices $U_i$ (i=1, n, . . . , n+k), receives a value $c_i$ from the communication devices $U_i$ (i=2, . . . , n−1), generates a value sid by using the values $c_1, \ldots, c_{n+k}$ based on a target-collision resistant hash function, and transmits, to the communication devices $U_i$, (sid, $R_{i-1}$) with respect to i=1, 2, the value sid with respect to i=3, . . . , n−2, (sid, $R_{i+1}$) with respect to i=n−1, n, and (sid, $R_{i-1}$, $R_{i+1}$) with respect to i=n+1, . . . , n+k (here, $R_0 = R_{n+K}$, $R_{n+k+1} = R_1$), and execute a third key generation processing which receives ($T_1$, T') from the representative communication device $U_1$, receives ($k_i$, $s_i$, $T_i$) from the communication device $U_i$ (i=2, n−1, . . . , n+k), receives ($k_i$, $s_i$) from the communication devices $U_i$ (i=3, . . . , n−2), generates a value $k_s$ by using the secret strings $st_S$ and $st'_S$ based on a twisted pseudo-random function, computes a value k' by an exclusive OR of the values $k_2, \ldots, k_{n+k}$, $k_s$, computes a value T'$_i$ by an exclusive OR of the values $T_1, \ldots, T_{i-1}$ with respect to i=2, . . . , n+k (here, $T_i$ is nil with respect to i=3, . . . , n−1), transmits the value k' to the representative communication device $U_1$, and transmits (k', T'$_i$, T') to the communication devices $U_i$ (i=2, . . . , n+k), and the communication devices $U_i$ (i=1, . . . , n+k) include a storage which stores a secret key $sk_i$ for public key encryption and secret strings $st_i$ and $st'_i$ of the communication devices $U_i$ and further stores information r generated in a session established by the communication devices $U_1, \ldots, U_n$ with respect to i= 1, . . . , n, circuitry configured to:

execute a first key generation processing which generates values $r_i$, $k_i$, and $s_i$ by using the secret strings $st_i$ and $st'_i$ based on the twisted pseudo-random function, computes the values $R_i = g^{r_i}$ and $c_i = g^{k_i} h^{s_i}$ (here, each of g and h denotes a generation source of a group G, which is a multiplication cyclic group of a prime number order p of κ bits), and transmits ($R_i$, $c_i$) to the key distribution device S with respect to i=1, n, . . . , n+k, and generates values $k_i$ and $s_i$ by using the secret strings $st_i$ and $st'_i$ based on the twisted pseudo-random function, computes the value $c_i = g^{k_i} h^{s_i}$, and transmits the value $c_i$ to the key distribution device S with respect to i=2, . . . , n−1, execute a second key generation processing which receives (sid, $R_{n+k}$) from the key distribution device S, generates a value $K_1^l$ by using (sid, $R_{n+k}^{r1}$) based on the pseudo-random function, generates a value $K_1^r$ by using (sid, $g^{r1 \cdot r}$) based on the pseudo-random function, computes the value $T_1$ by an exclusive OR of the values $K_1^l$ and $K_1^r$, computes the value T' by an exclusive OR of the value $K_1^l$ and $k_1 \| s_1$, and transmits ($T_1$, T') to the key distribution device S with respect to i=1, receives (sid, $R_1$) from the key distribution device S, generates a value $K_2^l$ by using (sid, $R_1^r$) based on the pseudo-random function, generates a value $K_2^r$ by using (sid, $g^r$) based on the pseudo-random function, computes the value $T_2$ by an exclusive OR of the values $K_2^l$ and $K_2^r$, and transmits ($k_2, s_2, T_2$) to the key distribution device S with respect to i=2, receives the value sid from the key distribution device S and transmits ($k_i, s_i$) to the key distribution device S with respect to i=3, . . . , n−2, receives (sid, $R_n$) from the key distribution device S, generates a value $K_{n-1}^l$ by using (sid, $g^r$) based on the pseudo-random function, generates a value $K_{n-1}^r$ by using (sid, $R_n^r$) based on the pseudo-random function, computes the value $T_{n-1}$ by an exclusive OR of the values $K_{n-1}^l$ and $K_{n-1}^r$, and transmits ($k_{n-1}, s_{n-1}, T_{n-1}$) to the key distribution device S with respect to i=n−1, receives (sid, $R_{n+1}$) from the key distribution device S, generates a value $K_n^l$ by using (sid, $R_n^r$) based on the pseudo-random function, generates a value $K_n^r$ by using (sid, $R_{n+1}^{r_n}$) based on the pseudo-random function, computes the value $T_n$ by an exclusive OR of the values $K_n^l$ and $K_n^r$, and transmits ($k_n, s_n, T_n$) to the key distribution device S with respect to i=n, and receives (sid, $R_{i-1}$, $R_{i+1}$) from the key distribution device S, generates a value $K_i^l$ by using (sid, $R_{i-1}^{r_i}$) based on the pseudo-random function, generates a value $K_i^r$ by using (sid, $R_{i+1}^{r_i}$) based on the pseudo-random function, computes the value $T_i$ by an exclusive OR of the values $K_i^l$ and $K_i^r$, and transmits ($k_i, s_i, T_i$) to the key distribution device S with respect to i=n+1, . . . , n+k, and execute a session key generation processing which receives the value k' from the key distribution device S and generates a common key $K_2$ by using the value sid and an exclusive OR of the values k' and $k_1$ based on the pseudo-random function with respect to i=1, receives (k', $T'_i$, T') from the key distribution device S, computes the value $K_1^l$ by an exclusive OR of the values $T'_i$ and $K_i^l$, computes $k_1\|s_1$ by an exclusive OR of the values T' and $K_1^l$, and generates the common key $K_2$ by using the value sid and the exclusive OR of the values k' and $k_1$ based on the pseudo-random function with respect to i=2, n, . . . , n+k, and receives (k', $T'_i$, T') from the key distribution device S, computes the value $K_1^l$ by an exclusive OR of the values $T'_i$ and $g^r$, computes $k_1\|s_1$ by an exclusive OR of the values T' and $K_1^l$, and generates the common key $K_2$ by using the value sid and the exclusive OR of the values k' and $k_1$ based on the pseudo-random function with respect to i=3, . . . , n−1.

12. A non-transitory computer-readable storage medium which stores a program for causing a computer to operate as a communication device which is included in key exchange system comprising:

a key distribution device S; and n pieces (here, n is an integer which is 2 or larger) of communication devices $U_i$ (i=1, . . . , n), wherein R={$U_{j1}$, . . . , $U_{jm}$} is a subset of {$U_1$, . . . , $U_n$} and N={$U_{j1-1}$, $U_{j1+1}$, . . . , $U_{jm-1}$, $U_{jm1}$} is a subset of {$U_1$, . . . , $U_n$}, $\|$ is a concatenation operator, $U_1$ ($\in$N) is one piece of representative communication device which is selected from N, the key distribution device S includes a storage which stores a secret key $sk_S$ for public key encryption and secret strings $st_S$ and $st'_S$ of the key distribution device S, circuitry configured to:

execute a session ID generation processing which receives ($R_i$; $c_i$) from the communication devices $U_i$ ($\in$N), receives a value $c_i$ from the communication devices $U_i$ ($\in$({$U_1$, . . . , $U_n$}−R)−N), generates a value sid by using {$c_i$|i satisfies $U_i\in$ {$U_1$, . . . , $U_n$}−R} based on a target-collision resistant hash function, and transmits, to the communication devices $U_i$, (sid, $R_j$) with respect to i which satisfies $U_i\in$N and $U_{i+1}\in$R (here, j is a minimum index which satisfies $U_j\in$N and j>i), (sid, $R_{j'}$) with respect to i which satisfies $U_i\in$N and $U_{i-1}\in$R (here, j' is a maximum index which satisfies $U_{j'}\in$N and j'<i), and the value sid with respect to i which satisfies $U_i\in$ ({$U_1$, . . . $U_n$}−R)−N, and execute a third key generation processing which receives ($T_1$, T') from the representative communication device $U_1$, receives ($k_i, s_i, T_i$) from the communication devices $U_i$ ($\in$({$U_1$, . . . , $U_n$}−R)−{$U_1$}), generates a value $k_s$ by using the secret strings $st_S$ and $st'_S$ based on the twisted pseudo-random function, computes a value k' by an exclusive OR of {$k_i$|i satisfies $U_i\in$({$U_1$, . . . , $U_n$}−R)−{$U_1$}} and the value $k_s$, computes a value $T'_i$ by an exclusive OR of the values $T_1$, . . . , $T_j$, . . . , $T_{i-1}$ (here, $T_j$ is nil with respect to j which satisfies $U_j\in$R) with respect to i which satisfies $U_i\in$ {$U_1$, . . . , $U_n$}−R, transmits the value k' to the representative communication device $U_1$, and transmits (k', $T'_i$, T') to the communication devices $U_i$ ($\in$({$U_1$, . . . , $U_n$}−R)−{$U_1$}), and the communication devices $U_i$ ($\in$ {$U_1$, . . . , $U_n$}−R) include a storage which stores a secret key $sk_i$ for public key encryption and secret strings $st_i$ and $st'_i$ of the communication devices $U_i$ and stores information $H_i^l$ and $H_i^r$ generated in a session established by the communication devices $U_1$, . . . , $U_n$, circuitry configured to:

execute a first key generation processing which generates values $r_i$, $k_i$ and $s_i$ by using the secret strings $st_i$ and $st'_i$ based on a twisted pseudo-random function, computes the values $R_i=g^{r_i}$ and $c_i=g^{k_i}h^{s_i}$ (here, each of g and h denotes a generation source of a group G, which is a multiplication cyclic group of a prime number order p of κ bits), and transmits ($R_i, c_i$) to the key distribution device S with respect to i which satisfies $U_i\in$N, and generates values $k_i$ and $s_i$ by using the secret strings $st_i$ and $st'_i$ based on the twisted pseudo-random function, computes the value $c_i=g^{k_i}h^{s_i}$, and transmits the value $c_i$ to the key distribution device S with respect to i which satisfies $U_i\in$({$U_1$, . . . , $U_n$}−R)−N, execute a second key generation processing which, with respect to i=1, receives (sid, $R_3$, $R_{n-1}$) from the key distribution device S, generates a value $K_1^l$ by using (sid, $R_{n-1}^{r_1}$) based on the pseudo-random function, generates a value $K_1^r$ by using (sid, $R_3^{r_1}$) based on the pseudo-random function, computes the value $T_1$ by an exclusive OR of the values $K_1^l$ and $K_1^r$, computes the value T' by an exclusive OR of the value $K_1^l$ and $k_1\|s_1$, and transmits ($T_1$, T') to the key distribution device S in a case where $U_j=U_3$ and $U_j=U_{n-1}$ are satisfied, receives (sid, $R_{n-1}$) from the key distribution device S, generates a value $K_1^l$ by using (sid, $R_{n-1}^{r_1}$) based on the pseudo-random function, generates a value $K_1^r$ by using (sid, $H_1^r$) based on the pseudo-random function, computes the value $T_1$ by the exclusive OR of the values $K_1^l$ and $K_1^r$, computes the value T' by the exclusive OR of the value $K_1^l$ and $k_1\|s_1$, and transmits $(T_1, T')$ to the key distribution device S in a case where $U_j=U_{n-1}$ and $U_2 \in N$ are satisfied, and receives (sid, $R_3$) from the key distribution device S, generates a value $K_1^l$ by using (sid, $H_1^l$) based on the pseudo-random function, generates a value $K_1^r$ by using (sid, $R_3^{r1}$) based on the pseudo-random function, computes the value $T_1$ by the exclusive OR of the values $K_1^l$ and $K_1^r$, computes the value T' by the exclusive OR of the value $K_1^l$ and $k_1\|s_1$, and transmits $(T_1, T')$ to the key distribution device S in a case where $U_j=U_3$ and $U_n \in N$ are satisfied; with respect to i which satisfies $U_i \in N$ and $U_{i+1} \in R$ (i is not 1), receives (sid, $R_j$) from the key distribution device S, generates a value $K_i^l$ by using (sid, $H_i^l$) based on the pseudo-random function, generates a value $K_i^r$ by using (sid, $R_j^{ri}$) based on the pseudo-random function, computes the value $T_i$ by an exclusive OR of the values $K_i^l$ and $K_i^r$, and transmits $(k_i, s_i, T_i)$ to the key distribution device S; with respect to i which satisfies $U_i \in N$ and $U_{i-1} \in R$ (i is not 1), receives (sid, $R_{j'}$) from the key distribution device S, generates a value $K_i^l$ by using (sid, $R_{j'}^{ri}$) based on the pseudo-random function, generates a value $K_i^r$ by using (sid, $H_i^r$) based on the pseudo-random function, computes the value $T_i$ by the exclusive OR of the values $K_i^l$ and $K_i^r$, and transmits $(k_i, s_i, T_i)$ to the key distribution device S; and with respect to i which satisfies $U_i \in (\{U_1, \ldots, U_n\}-R)-N$ (i is not 1), receives the value sid from the key distribution device S, generates a value $K_i^l$ by using (sid, $H_i^l$) based on the pseudo-random function, generates a value $K_i^r$ by using (sid, $H_i^r$) based on the pseudo-random function, computes the value $T_i$ by the exclusive OR of the values $K_i^l$ and $K_i^r$, and transmits $(k_i, s_i, T_i)$ to the key distribution device S, and execute a session key generation processing which, with respect to i=1, receives the value k' from the key distribution device S and generates a common key $K_2$ by using the value sid and an exclusive OR of the values k' and $k_1$ based on the pseudo-random function, and with respect to i which satisfies $U_i \in (\{U_1, \ldots, U_n\}-R)-\{U_1\}$, receives (k', $T_i$, T') from the key distribution device S, computes the value $K_1^l$ by an exclusive OR of the values $T_i$ and $K_i^l$, computes $k_1\|s_1$ by an exclusive OR of the values T' and $K_1^l$, and generates the common key $K_2$ by using the value sid and the exclusive OR of the values k' and $k_1$ based on the pseudo-random function.

\* \* \* \* \*

UNITED STATES PATENT AND TRADEMARK OFFICE
CERTIFICATE OF CORRECTION

PATENT NO. : 10,630,465 B2
APPLICATION NO. : 15/487895
DATED : April 21, 2020
INVENTOR(S) : Kobayashi et al.

Page 1 of 2

It is certified that error appears in the above-identified patent and that said Letters Patent is hereby corrected as shown below:

In the Claims

Column 25, Line 16, please change from "$U_1, U_n$" to --$U_1, ..., U_n$--;

Column 25, Line 18, please change from "$_1$" to --$U_1$--;

Column 26, Line 14, please change from "(i=n+1, n+k)" to --(i=n+1, ..., n+k)--;

Column 28, Line 64, please change from "(i=1, . . . n, n+k)" to --(i=1, n, ..., n+k)--;

Column 31, Line 22, please change from "(sid, $R_1^r$)" to --(sid, $H_1^r$)--;

Column 32, Line 4, please change from "$k_1|s_1$" to --$k_1\|s_1$--;

Column 33, Line 20, please change from "(i satisfies $U_i \in N$ and $U_{i-1} \Sigma R$)" to --(i satisfies $U_i \in N$ and $U_{i-1} \in R$)--;

Column 34, Line 13, please delete the phrase "the key distribution";

Column 34, Line 14, please change from "device S includes" to --the key distribution device S includes--;

Column 34, Line 42, please change from "$T_1, ..., T_j, T_{i-1}$" to --$T_1, ..., T_j, ..., T_{i-1}$--;

Column 38, Line 2, please delete the phrase "the key distribution";

Column 38, Line 3, please change from "device S includes" to --the key distribution device S includes--;

Signed and Sealed this
First Day of September, 2020

Andrei Iancu
*Director of the United States Patent and Trademark Office*

CERTIFICATE OF CORRECTION (continued)
U.S. Pat. No. 10,630,465 B2

Column 38, Line 11, please change from "$U_i(\in(\{U_1, ..., U_n\}\text{-R-N})$" to --$U_i(\in(\{U_1, ..., U_n\}\text{-R})\text{-N})$--; and Column 39, Line 25, please change from "$(sid, R_3^{r1})$" to --$(sid, R_j^{r1})$--.